United States Patent [19]

Ueda et al.

[11] Patent Number: 4,810,612

[45] Date of Patent: Mar. 7, 1989

[54] HEAT-FIXABLE ELECTROPHOTOGRAPHIC TONER COMPOSITION

[75] Inventors: Takashi Ueda, Iwakuni; Toshihiro Sagane, Yamaguchi, both of Japan

[73] Assignee: Mitsui Petrochemical Industries, Ltd., Tokyo, Japan

[21] Appl. No.: 206,893

[22] Filed: Jun. 8, 1988

Related U.S. Application Data

[63] Continuation of Ser. No. 82,964, Aug. 4, 1987, abandoned, which is a continuation of Ser. No. 802,443, Nov. 27, 1985, abandoned.

[30] Foreign Application Priority Data

| Nov. 30, 1984 | [JP] | Japan | 59-251688 |
| Dec. 10, 1984 | [JP] | Japan | 59-259393 |
| Aug. 9, 1985 | [JP] | Japan | 60-174042 |

[51] Int. Cl.$^4$ .................. G03G 9/10; G03G 9/14; G03G 9/08
[52] U.S. Cl. .................. 430/109; 430/110; 525/309; 525/310; 525/311; 525/322; 525/324
[58] Field of Search .............. 430/109, 110; 525/309, 525/310, 311, 322, 324

[56] References Cited

U.S. PATENT DOCUMENTS

| 3,848,025 | 11/1974 | Alberts et al. | 525/324 X |
| 3,868,433 | 2/1975 | Bartz et al. | 525/311 X |
| 3,953,541 | 9/1976 | Fuji | 525/310 X |
| 3,965,021 | 6/1976 | Clemens et al. | 430/109 |
| 3,974,078 | 8/1976 | Crystal | 430/109 |

FOREIGN PATENT DOCUMENTS

| 59-121052 | 7/1984 | Japan | 430/109 |
| 59-121053 | 7/1984 | Japan | 430/109 |

*Primary Examiner*—Roland E. Martin
*Attorney, Agent, or Firm*—Sherman and Shalloway

[57] ABSTRACT

A heat-fixable electrophotographic toner composition comprising
(A) a graft modified polyolefin composed of 100 parts by weight of a polyolefin having an intrinsic viscosity, measured in decalin at 135° C., of from 0.04 to 1.2 dl/g, and grafted thereto a monomer selected from the group consisting of (a) 1.0 to 100 parts by weight of acrylonitrile or methacrylonitrile, (b) 3 to 200 parts by weight of an aromatic carboxylic acid vinyl ester and (c) 2 to 43 parts by weight of an unsaturated carboxylic acid ester, and
(B) a coloring agent.

21 Claims, No Drawings

HEAT-FIXABLE ELECTROPHOTOGRAPHIC TONER COMPOSITION

This application is a continuation, of application Ser. No. 82,964 filed Aug. 4, 1987, now abandoned which in turn is a continuation of Ser. No. 802,443 filed Nov. 27, 1985, abandoned.

This invention relates to an electrophotographic toner composition, and more specifically, to a heat-fixable electrophotographic toner composition having a reduced tendency to adhesion to fixing rollers during heat fixing.

The electrophotographic toner composition, known as an electrostatic toner, is an image-forming material used in a step following charging and exposure in an electrophotographic process. It is a chargeable fine powder composed of a resin and carbon black or a pigment dispersed therein. Generally, electrostatic toners are classified into dry two-component toners used with carriers such as an iron powder or glass particles, wet toners dispersed in organic solvents such as isoparaffins, and dry one-component toners having a fine powder of a magentic material dispersed therein.

The image obtained on a photosensitive plate by development with the electrostatic toner is transferred to a receptor sheet and fixed with heat or a solvent vapor. The image directly developed on paper coated with a photosensitive layer is directly subjected to the fixing treatment. Fixation by hot rollers which involves direct contact with the toner image is preferred because it has a high thermal efficiency, the toner image can be accuately fixed by a heat source of relatively low temperatures, and moreover, it is suitable for high-speed copying. However when the image is fixed by contact with a heated body such as hot rollers, a so-called offset phenomenon occurs in which a part of the electrostatic toner adheres to the heating body and is transferred to the image area of a copy that subsequently reaches the fixing heated body. In particular, in high-speed copying, the heated body is kept at a high temperature so as to increase the effect and speed of fixing, and the increased temperatures result in a greater tendency to the offset phenomenon. Accordingly, when, for example, an image formed by using a one-comonent electrostatic toner is to be fixed by hot rollers, attempts are made to obviate the offset phenomenon by, for example, impregnating the roller surface with a silicone oil or supplying it to the roller surface. This may give rise to another problem such as the soiling of the rolls.

Examples of the thermoplastic resin as a main component of the electrostatic toner include styrene resins such as polystyrene, styrene/(meth)acrylate copolymers and styrene/(meth)acrylic acid copolymers, ketone resins, maleic acid resins, coumarone resin, phenolic resins, polyester resins, epoxy resins, terpene resins, polyvinylbutyral, and poly(butyl methacrylate). Among these, the styrene resins are most frequently used because they have good chargeability and suitable softening points (90° to 160° C.) and thus good fixability, low moisture absorption, and good miscibility with carbon black as a coloring material, and is easy to pulverize, and the photosensitive plate contaminated with the toner can be easily cleaned. In spite of these superior practical characteristics, the styrene resins tend to undergo offset in high-speed copying. It has been desired to develop an electrostatic toner which does not undergo offset.

There are two possible methods of solving the aforesaid problem, namely (i) improvement of the thermoplastic resin itself which is the main component of the electrostatic toner, and (ii) the addition of a releasing agent capable of avoiding the offset phenomenon while the thermoplastic resin as the main component of the electrostatic toner is left intact.

Techniques of adding polyolefin waxes as releasing agents to styrene polymers in an attempt to solve the above problem by the method (ii) are proposed in Japanese Patent Publications Nos. 3304/1977, 3305/1977, 52574/1982 and 58,664/1983, and Japanese Laid-Open Patent Publication No. 59455/1983. In these techniques, too, the compatibility of the polyolefin waxes with the styrene resin component is still insufficient. Hence, the properties of the polyolefin waxes as a releasing agent cannot be fully exhibited, and the toner tends to agglomerate during storage or during a copying operation. Furthemore, since the wax is liable to leave the toner, it tends to soil the photosensitive drum, etc. Another disadvantage is that the fixed image obtained by using the toner has poor bending resistance.

Japanese Laid-Open Patent Publication No. 90642/1982 discloses a toner for pressure fixation comprising a homopolymer of ethylene and a graft copolymer of an aromatic vinyl compound and acrylonitrile. Japanese Patent Publication No. 17109/1985 discloses a low-molecular-weight propylene polymer. None of these patent documents, however, describe anything on graft-modified polyolefins which can be used in heat-fixable electro-photographic developer materials.

It is an object of this invention therefore to provide a heat-fixable electrophotographic toner composition having a novel composition.

Another object of this invention is to provide an electrophotographic toner composition comprising a graft-modified polyolefin which has moderate compatibility with a thermoplastic resin binder as a main component of the electrostatic tone and excellent releasability.

Still another object of this invention is to provide an electrophotographic toner composition which obviates the offset phenomenon during heat fixing.

Other objects of this invention along with its advantage will become apparent from the following description.

According to this invention, these objects and advantages are achieved by a heat-fixable electrophotographic toner composition comprising (A) a graft modified polyolefin composed of 100 parts by weight of a polyolefin having an intrinsic viscosity, measured in decalin at 135° C., of from 0.04 to 1.2 dl/g, and grafted thereto a monomer selected from the group consisting of (a) 1.0 to 100 parts by weight of acrylonitrile or methacrylonitrile, (b) 3 to 200 parts by weight of an aromatic carboxylic acid vinyl ester and (c) 2 to 43 parts by weight of an unsaturated carboxylic acid ester, and (B) a coloring agent.

The graft modified polyolefin used in this invention has a polyolefin having an intrinsic viscosity, measured in decalin at 135° C., of from 0.04 to 1.2 dl/g as a trunk polymer. The monomer (a), (b) or (c) is grafted to the trunk polymer. Investigations of the present inventors have shown that all graft modified polyolefins composed of the above polyolefin as a common trunk polymer and the specific monomers (a), (b) and (c) as a grafting component achieves the objects of this invention when used in heat-fixable electrophotographic developer materials.

A heat-fixable electrophotographic tone should have excellent bondability to paper and excellent releasability from hot rollers without being transferred thereto when an image directly developed with the developer material on paper. It has been found that the graft modified polyolefins used in this invention give developer materials having excellent bondability and releasability.

The trunk polyolefin used in this invention has an intrinsic viscosity, measured in decalin at 135° C., of from 0.04 to 1.2 dl/g.

The polyolefin may be homopolymers or copolymers of alpha-olefins such as ethylene, propylene, 1-butene, 1-hexene, 4-methyl-1-pentene and 1-decene. Linear or branched alpha-olefins having 2 to 10 carbon atoms are preferably used.

Examples of the aforesaid polyolefin of relatively low molecular weights include polyolefins obtained by producing polyolefins of relatively high molecular weights by the high-pressure process or by the medium or low pressure process using transition metal compound catalysts and thermally decomposing the resulting polyolefins; high-pressure polyethylene obtained by radical polymerization of ethylene under high pressures; polymers obtained by medium or low pressure polymerization of ethylene or ethylene with the aforesaid alpha-olefins in the presence of transition metal compound catalysts, such as polyethylene and ethylene/alpha-olefin copolymers; polypropylene wax; propylene/1-butene copolymer; poly-1-butene; poly(4-methyl-1-pentene); and propylene/4-methyl-1-pentene copolymer. The polyolefins, as referred to herein, include oxidized polyolefins usually containing less than 10% of oxygen. Among the above exemplified polyolefins, polyethylene, polypropylene, ethylene/propylene copolymer, ethylene/1-butene copolymer, ethylene/4-methyl-1-pentene, propylene/1-butene copolymer, and poly-1-butene are preferred. The starting polyolefins may be solid, liquid or waxy, but the waxy polyolefins are preferred.

The graft modified polyolefin used in this invention is obtained by grafting a grafting monomer selected from the group consisting of (a) acrylonitrile or methacrylonitrile, (b) an aromatic carboxylic acid vinyl ester and (c) an unsaturated carboxylic acid ester to the aforesaid polyolefin (trunk polymer) having a relatively low molecular weight.

The grafting may, for example, be carried out by directly melting the trunk polyolefin or dissolving it in a solvent, and grafting the grafting monomer in the presence or absence of a radical initiator. Useful radical initiators include organic peroxides and organic peresters such as benzoyl peroxide, dichlorobenzoin peroxide, dicumyl peroxide, di-tert-butyl peroxide, 2,5-dimethyl-2,5-di(peroxybenzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl benzoate, tert-butylperphenylacetate, tert-butyl perisobutyrate, tert-butyl per-sec-octoate, tert-butyl perpivalate, cumyl perpivalate and tert-butyl perdiethylacetate; and azo compounds such as azobisisobutyronitrile and dimethyl azoisobutyrate. Preferred among these are dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane, and 1,4-bis(tertbutylperoxyisopropyl)benzene. The temperature at which the grafting reaction is carried out is usually 130° to 350° C., preferably 135° to 300° C.

When the grafting monomer is acrylonitrile or methacrylonitrile (a), a graft modified polyolefin composed of 100 parts by weight of the polyolefin having an intrinsic viscosity of 0.04 to 1.2 dl/g and grafted thereto 1.0 to 100 parts by weight of acrylonitrile or methacrylonitrile is obtained. The polyolefin preferably has an intrinsic viscosity of 0.05 to 0.8 dl/g.

If the intrinsic viscosity of the polyolefin is below the lower limit, a toner composition prepared by using a graft modified polyolefin obtained from the above polyolefin has too low a melt viscosity, and does not produce a sufficient releasing effect nor give a clear image. Furthermore, the toner tends to agglomerate or to soil the photosensitive plate in a copying machine. If, on the other hand, the intrinsic viscosity of the polyolefin exceeds the upper limit, a graft polyolefin obtained from the trunk polyolefin has poor compatibility with a binder resin such as a styrene resin, and a toner composition prepared from the grafted polyolefin has so high a melt viscosity that it fails to show a sufficient releasing effect, nor does it have sffficient fixability to paper.

The amount of acrylonitrile or methacrylonitrile grafted should be from 1.0 to 100 parts by weight, preferably from 2.0 to 80 parts by weight, per 100 parts by weight of the trunk polyolefin. If the amount of the grafting acrylonitrile or methacrylonitrile exceeds the above-specified upper limit, the compatibility of the modified polyolefin with a binder resin such as a styrene resin becomes too high, and at the time of fixation, the modified polyolefin in the toner has difficulty in migrating to the surface of the molten toner and thus has a reduced effect as a releasing agent. Consequently, the adhesion of the toner to heat fixing rollers occurs. On the other hand, if the amount of acrylonitrile or methacrylonitrile grafted falls below the above-specified lower limit, the modified polyolefin has poor compatibility with the binder resin, and the resulting toner has reduced releasability, agglomeration resistance, photosensitive drum soiling resistance and bending resistance which are usually improved with an increase in compatibility. Furthermore, the dispersion of the coloring agent in the resin becomes poor, and the fixability of the toner to paper becomes insufficient.

The modified polyolefin having acrylonitrile or methacrylonitrile as the graft monomer has an intrinsic viscosity of preferably 0.03 to 0.9 dl/g, more preferably 0.08 to 0.8 dl/g.

When the grafting monomer is (b) an aromatic carboxylic acid vinyl ester, a graft modified polyolefin composed of 100 parts of the polyolefin having an intrinsic viscosity of 0.04 to 1.2 dl/g and 3 to 200 parts by weight of the aromatic carboxylic acid vinyl ester as the grafting monomer is obtained.

The aromatic carboxylic acid vinyl ester used is represented by the following formula

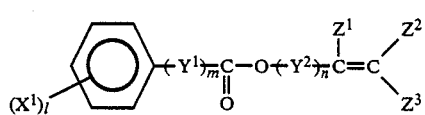

wherein $X^1$, $Z^1$, $Z^2$ and $Z^3$, independently from each other, represent a hydrogen atom or a monovalent organic group, and $Y^1$ and $Y^2$, independently from each other, represent a divalent organic group, l is 0 or an integer of 1 to 5, and m and n, independently from each other, represent 0 or 1.

Examples of the compound of the above formula are vinyl benzoate, vinyl cinnamate, vinyl alpha-phenylcinnamate, vinyl beta-phenylcinnamate, vinyl phenylacetate, vinyl benzylacetate, vinyl phenylpropionate, vinyl anilinoacetate, vinyl gamma-phenylcrotonate, vinyl phenylpyruvate and vinyl phenoxyacetate. Of these, vinyl benzoate and vinyl cinnamate are especially preferred. These compounds may be used singly or in combination.

The polyolefin used for the production of the graft modified polyolefin preferably has an intrinsic viscosity of 0.05 to 1.1 dl/g. The reason for the limitation of the upper and lower limits of the intrinsic viscosity is the same as given hereinabove to the case of using acrylonitrile or methacrylonitrile as the grafting monomer.

The amount of the aromatic carboxylic acid vinyl ester grafted is 3 to 200 parts by weight, preferably 5 to 200 parts by weight, per 100 parts of the trunk polymer. If the amount of the vinyl ester falls outside the abovespecified range, the same inconveniences as described in the case of using acrylonitrile or methacrylonitrile as the grafting monomer occur.

The modified polyolefin having the aromatic carboxylic acid vinyl ester as the grafting monomer has an intrinsic viscosity of preferably 0.03 to 0.9 dl/g, more preferably 0.08 to 0.8 dl/g.

When the grafting monomer is an unsaturated carboxylic acid ester (c), a graft modified polyolefin composed of 100 parts by weight of the polyolefin having an intrinsic viscosity of 0.04 to 1.2 dl/g and grafted thereto 2 to 43 parts by weight of the unsaturated carboxylic acid ester is obtained.

Examples of the unsaturated carboxylic acid esters include acrylates such as methyl acrylate, ethyl acrylate, n-butyl arylate, isobutyl acrylate, propyl acrylate, n-octyl acrylate, dodecyl acrylate, lauryl acrylate, 2-ethylhexyl acrylate, stearyl acrylate, cyclohexyl acrylate, 2-chloroethyl acrylate, phenyl acrylate, methyl alpha-chloroacrylate, 2-hydroxyethyl acrylate, diethylaminoethyl acrylate, an ethoxy ester of diethylene glycol acrylate, 2-ethoxy acrylate, 1,4-butanediol diacrylate, 2,2,2-trifluoroethyl acrylate and 2-acryloyloxyethyl acid phosphate; methacrylates such as methyl methacrylate, ethyl methacrylate, propyl methacrylate, n-butyl methacrylate, isobutyl methacrylate, n-octyl methacrylate, dodecyl methacrylate, lauryl methacrylate, 2-ethylhexyl methacrylate, stearyl methacrylate, phenyl methacrylate, dimethylaminoethyl methacrylate, diethylaminoethyl methacrylate, 2-hydroxyethyl methacrylate, glycidyl methacrylate, 2,2,2-trifluoroethyl methacrylate and 2-methacryloyloxyethyl acid phosphate; and unsaturated dibasic acid esters such as monoethyl maleate, diethyl maleate, monopropyl maleate, dipropyl maleate, monobutyl maleate, dibutyl maleate, di(2-ethylhexyl) maleate, monoethyl fumarate, diethyl fumarate, dibutyl fumarate, di(2-ethylhexyl) fumarate, monoethyl itaconate, diethyl itaconate, monobutyl itaconate, di(2-ethylhexyl) itaconate, monoethyl citraconate, diethyl citraconate, dibutyl citraconate and di(2-ethylhexyl) citraconate.

The above unsaturated carboxylic acid esters may be used singly or in combination. Of these, the unsaturated dibasic acid esters are preferred.

The polyolefin for the production of the graft modified polyolefin using the monomer (c) has an intrinsic viscosity of preferably 0.07 to 0.6 dl/g, especially preferably 0.08 to 0.5 dl/g.

The reason for the limitation of the intrinsic viscosity of the polyolefin is the same as that given to the case of using acrylonitrile or methacrylonitrile as the grafting monomer.

The amount of the unsaturated carboxyic acid ester grafted is 2 to 43 parts by weight, preferably 3 to 33 parts by weight, per 100 parts by weight of the trunk polymer. If the amount of the monomer (c) grafted falls outside the above-specified range, the same inconveniences as described above with regard to the case of using acrylonitrile or methacrylonitrile as the grafting monomer occur.

The modified polyolefin having the unsaturated carboxylic acid ester as the grafting monomer has an intrinsic viscosity of preferably 0.05 to 0.8 dl/g, more preferably 0.08 to 0.5 dl/g.

The graft modified polyolefin (A) can be used as a releasing agent or as a binder in a heat-fixable electrophotographic toner composition.

The graft modified polyolefins (A), if desired, may have other monomers (those which are different from the monomers (a), (b) and (c) described above) grafted thereto in an amount of less than 70 mole %, particularly less than 50 mole %, based on the total amount of the grafting monomers. Examples of such other grafting monomers include acrylates such as methyl acrylate, ethyl acrylate, n-butyl acrylate, isobutyl acrylate, propyl acrylate, n-octyl acrylate, dodecyl acrylate, lauryl acrylate, 2-ethylhexyl acrylate, stearyl acrylate, cyclohexyl acrylate, 2-chloroethyl acrylate, phenyl acrylate, methyl alpha-chloroacrylate, 2-hydroxyethyl acrylate, diethylaminoethyl acrylate, diethylene glycol ethoxylate acrylate, 2-ethoxy acrylate, 1,4-butanediol diacrylate, 2,2,2-trifluoroethyl acrylate and 2-acryloyloxyethyl acid phosphate; methacrylates such as methyl methacrylate, ethyl methacrylate, propyl methacrylate, n-butyl methacrylate, isobutyl methacrylate, n-octyl methacrylate, dodecyl methacrylate, lauryl methacrylate, 2-ethylhexyl methacrylate, stearyl methacrylate, phenyl methacrylate, dimethylaminoethyl methacrylate, diethylaminoethyl methacrylate, 2-hydroxyethyl methacrylate, glycidyl methacrylate, 2,2,2-trifluoroethyl methacrylate and 2-methacryloyloxyethyl acid phosphate; unsaturated dibasic acid esters such as monoethyl maleate, diethyl maleate, monopropyl maleate, dipropyl maleate, monobutyl maleate, dibutyl maleate, di(2-ethylhexyl) maleate, monoethyl fumarate, diethyl fumarate, dibutyl fumarate, di(2-ethylhexyl) fumarate, monoethyl itaconate, diethyl itaconate, monobutyl itaconate, di(2-ethylhexyl) itaconate, monoethyl citraconate, diethyl citraconate, dibutyl citraconate and di(2-ethylhexyl) citraconate; and other monomers including styrene, alpha-methylstyrene, vinyltoluene, acrylonitrile, methacrylonitrile, N-methylolacrylamide, vinyl acetate, vinyl chloride, vinyl pyrrolidone, vinyl pyridine, vinyl carbazole, vinyl butyral, vinyl acetate, acrylic acid, methacrylic acid, and maleic anhydride. It should be understood that above acrylates, methacrylates and unsaturated dibasic acid esters are not used when the main grafting monomer is (c); vinyltoluene is not used when the main grafting monomer is (b); and acrylonitrile and methacrylonitrile are not used when the main grafting monomer is (a).

The heat-fixable electrophotographic toner composition of this invention comprises the graft modified polyolefin (A) and the coloring agent (B). If it is desired to have the graft modified polyolefin exhibit a releasing action, a binder resin is further incorporated. The binder resin may preferably be a homopolymer of a styrene-type monomer or a copolymer of a styrene-type monomer such as styrene, alpha-methylstyrene, beta-methylstyrene, o-, m- or p-methylstyrene and o-, m- or p-chlorostyrene and another vinyl-type monomer, for example. Such a polymer or copolymer is known per se, and is described, for example, in Japanese Patent Publication No. 6,895/1980. Examples of the other vinyl monomer include p-chlorostyrene; vinylnaphthalene; unsaturated monolefins such as ethylene, propylene, butylene and iosobutylene; vinyl halides such as vinyl chloride, vinyl bromide and vinyl fluoride; vinyl esters such as vinyl acetate, vinyl propionate, vinyl benzoate and vinyl butyrate; esters of alpha-methylene aliphatic monocarboxylic acids such as methyl acrylate, ethyl acrylate, n-butyl acrylate, isobutylacrylate, n-octyl acrylate, dodecyl acrylate, 2-chloroethyl acrylate, phenyl acrylate, methyl alphachloroacrylate, methyl methacrylate, ethyl methacrylate and n-butyl methacrylate; acrylonitrile; methacrylonitrile; acrylamide; vinyl ethers such as vinyl methyl ether, vinyl ethyl ether and vinyl isobutyl ether; vinyl ketones such as vinyl methyl ketone, vinyl hexyl ketone and methyl isopropenyl ketone; and N-vinyl compounds such as N-vinylpyrrole, N-vinylcarbazole, N-vinylindole and N-vinylpyrrolidone. One or more of these other vinyl monomers can be copolymerized with the styrene monomer. The styrene polymer preferably has a number average molecular weight of at least about 2,000, especially preferably 3,000 to 30,000. Preferably, the styrene component content of the polymer is at least 25% by weight based on the entire weight of the styrene-type polymer.

Other thermoplastic resins which can be used in this invention as a binder, excepting the styrene-type polymers indicated above, include polyester resins, ketone resins, maleic acid resins, coumarone resin, phenolic resins, epoxy resins, terpene resins, polyvinylbutyral, poly(butyl methacrylate), polyvinyl chloride, polyethylene, polypropylene, polybutadiene and ethylene/vinyl acetate copolymer.

Among the above binder resins, the styrene-type polymers and polyester resins are preferred.

Advantageously, in the toner composition in which the graft modified polyolefin (A) is required to exhibit a releasing action, the proportion of the binder resin is 80 to 99% by weight, especially 90 to 98% by weight, based on the total weight of the binder resin and the graft modified polyolefin.

When the graft modified polyolefin (A) itself is used as a binder, it is not necessary to use another releasing agent since the modified polyolefin (A) itself has excellent releasability as stated above.

When the other binder resin is used in combination, its proportion is desirably less than 75% by weight, especially less than 50% by weight, based on the total weight of the graft modified polyolefin and the other binder resin.

The coloring agent (B) used in the toner composition of this invention preferably contain at least one pigment or dye, such as carbon black, Phthalocyanine Blue, Aniline Blue, Algol Oil Blue, Chrome Yellow, Ultramarine Blue, Quinoline Yellow, Lamp Black, Rose Bengale, Diazo Yellow, Rhodamine B Lake, Carmine 6B and quinacridone derivatives. As required, oil-soluble dyes such as azine-type nigrosine dyes, induline, azo dyes, anthraquinonic dyes, triphenylmethane dyes, xanthene-type dyes and phthalocyanine dyes may be used together for the purpose of color adjustment or charge control.

The toner composition of this invention may contain other components which do not reduce the effects of this invention. For examples charge controlling agents, plasticizers, and other toner additives may be incorporated. The amounts of these are arbitrary.

The toner composition of this invention may be used either as a toner for a two-component developer or a one-component developer.

When the toner composition of this invention is used for a two-component developer, it is prepared by mixing the graft modified polyolefin (A), the coloring agent (B) and as required the thermoplastic binder resin by known methods, for example by using a ball mill or an attriter, then kneading the mixture by a hot two roll mill, a hot kneader, an extruder, etc., cooling and solidifying the mixture, coarsely pulverizing it with a hammer mill, a crusher, etc. and then finely pulverizing it in a jet mill or a vibratory mill, or in the presence of water, in a ball mill or an attriter to prepare a powder having an average particle diameter of about 5 to 35 microns. The resulting toner composition is used in combination with a carrier. The carrier used may include, for example, silica sand, glass beads or iron balls having a diameter of 200 to 700 microns, or a powder of a magnetic material such as iron, nickel, or cobalt.

When the toner composition of this invention is to be used as a one-component developer, the modified polyolefin (A), the coloring agent (B), the thermoplastic resin as an optional component, and a magnetic powder are mixed in the same way as in the preparation of the toner for the two-component developer. Usually, a fine magnetite powder having a particle diameter of not more than 1 micron is used as the magnetic powder to be added to the toner composition. There can also be used powders of metals such as cobalt, iron and nickel, alloys and oxides thereof, ferrites, and mixtures of these. In the one-component developer, the proportion of the magnetic material is usually 40 to 70 parts by weight per 100 parts by weight of the thermoplastic resin including the modified polyolefin (A), and the magnetic material. If the proportion of the magnetic material is excessively large, the electric resistance of the developer decreases, and the electrostatic toner has poor ability to hold a charge. This may result in blurring of the resulting image. Furthermore, the softening point of the electrostatic toner becomes high, and proper fixation may become difficult. On the other hand, when the proportion of the magnetic material is too small, the function of the electrostatic toner may be lost and it fails to gain the required chargeability. Furthermore, the toner is liable to scatter. Known charge controlling agents may be added to such a one-component or two-component developers.

Investigations of the present inventors have shown that like the above graft modified polyolefins (A), polyolefins having an intrinsic viscosity of 0.06 to 0.6 dl/g and an acid number of 6 to 200 mg-KOH/g and containing carboxyl groups in which the main structural units of the polymer skeleton are composed of polymer units from alphaolefins having 3 to 10 carbon atoms can be provided as polymers capable of exhibiting a releasing action when used together with the aforesaid binder resins.

These carboxyl-containing polyolefins can be produced, for example, by (a) grafting unsaturated carboxylic acids or anhydrides thereof to polyolefins obtained directly by polymerization of alpha-olefins having 3 to 10 carbon atoms either alone or with other olefins in the presence of Ziegler-type catalysts, or polyolefin waxes obtained by thermally decomposing polyolefins having the same composition as the above polyolefins; or (b) thermally decomposing high-pressure or low-pressure high-molecular-weight polyolefins having the same compositions as the above polyolefins or waxes while oxidizing them, or grafting unsaturated carboxylic acids or anhydrides thereof to such polyolefins while thermally decomposing them.

In the above method (a), the polyolefin obtained by direct polymerization of a monomer with a Ziegler catalyst or the polyolefin waxes obtained by thermal decomposition in the method (a) preferably have an intrinsic viscosity of 0.06 to 0.8 dl/g. In the method (b), polyolefins having an intrinsic viscosity of at least 0.2 dl/g are preferably used.

As stated above, the carboxyl-containing polyolefins are obtained by oxidizing the starting polyolefins or polyolefin waxes. Specifically, the method described in Japanese Laid-Open Patent Publication No. 219730/1984 may be employed. When the method is employed in which the starting polyolefins or polyolefin waxes are modified with unsaturated carboxylic acids or the like in the presence of radical initiators (heat decomposition may sometimes occur simultaneously), a method substantially in accordance with the method described in Japanese Laid-Open Patent Publication No. 217709/1984 is preferably used. Specific examples of the unsaturated carboxylic acids or anhydrides therefore used for this purpose include unsaturated monocarboxylic acids such as acrylic acid, crotonic acid and methacrylic acid; unsaturated dicarboxylic acids such as maleic acid, fumaric acid, itaconic acid, citraconic acid, allylsuccinic acid, mesaconic acid, glutaconic acid, endocis-bicyclo[2,2,1]hept-2-ene-5,6-dicarboxylic acid (Nadic acid ®), methylendocis-bicyclo[2,2,1]hept-2-ene-5,6-dicarboxylic acid (methylNadic acid ®), tetrahydrophthalic acid and methylhexahydrophthalic acid; and unsaturated dicarboxylic acid anhydrides such as maleic anhydride, itaconic anhydride, citraconic anhydride, allylsuccinic anhydride, glutaconic anhydride, Nadic anhydride, methylNadic anhydride, tetrahydrophthalic anhydride and methyltetrahydrophthalic anhydride. These compounds may be used in combination. Of these unsaturated carboxylic acids, maleic acid, maleic anhydride, crotonic acid, Nadic acid and Nadic anhydride are preferred.

The carboxyl-containing polyolefins preferably have an intrinsic viscosity of 0.07 to 0.5 dl/g and an acid number of 8 to 180 mg-KOH/g.

The upper and lower limits of the intrinsic viscosity and acid number have been specified for the same reason as given to the upper and lower limits of themodified polyolefin resins containing acrylonitrile or methacrylonitrile as the grafting monomer.

The carboxyl-containing polyolefins can be used as polyolefins exhibiting releasability together with the binder resins and coloring agents described above in the same way as described hereinabove.

As stated above, the graft modified polyolefins (A) of this invention used as a releasing agent or as a binder, and the carboxyl-containing polyolefins used as a releasing agent give the heat-fixable toner composition of this invention which has excellent releasability from hot rolls or the like at high temperatures, and therefore does not undergo offset even at high roll temperatures and an increased fixing speed and is suitable for high-speed copying.

Furthermore, since the toner composition of this invention has excellent fixability to paper and can be fixed satisfactorily even at low roll temperatures, it is very suitable for copying with reduced energy consumption. In addition, the toner composition of this invention has little tendency to agglomeration and excellent development characteristics, and after fixation, shows excellent bending resistance.

The releasing agent provided in accordance with this invention not only has excellent compatibility with binder resins such as styrene-type polymer, but also shows excellent compatibility or affinity with various additives such as pigments, dyes, charge controlling agents, and plasticizers. Accordingly, it increases the dispersibility of these additives in the binder resins and the physical uniformity, such as charge controllability, of the toner, and thus improve the functional properties of the toner composition as a developer.

The following examples illustrate the present invention more specifically. All parts in these examples are by weight unless otherwise specified.

EXAMPLE 1

(1) Preparation of an acrylonitrile-grafted polyolefin wax

Five hundred grams of a polyethylene wax (homopolymer) having an intrinsic viscosity of 0.23 dl/g and obtained by polymerization in the presence of a Ziegler catalyst (all polyethylene waxes used in subsequent examples were obtained by polymerization with Ziegler catalysts) was charged into a 1.5-liter glass reactor, and melted at 160° C. While the inside of the reactor was maintained at 160° C., 100 g of acrylonitrile and 8.8 g of di-t-butyl peroxide (DTBPO for short) were continuously added dropwise over 3 hours from separate dropping funnels with stirring. The mixture was stirred for 1 hour at 160° C., and while being kept in he molten state, subjected to a deaerating treatment for 1 hour under a vacuum of 10 mmHg to remove the volatile components. The mixture was then cooled. Then, 20 g of the cooled product was dissolved in 200 ml of p-xylene, and the solution was added to 600 ml of N,N-dimethylformamide (DMF) at 60° C. with stirring, and the mixture was cooled to room temperature. The solid portion precipitated was washed twice with 500 ml of DMF, and dried. The acrylonitrile content of the resulting solid portion was examined by $^1$H-NMR The amount of acrylonitrile grafted, measured as above, was 15.3 parts per 100 parts of the acrylonitrile-grafted polyethylene wax [i.e., 18.1 parts of acrylonitrile per 100 parts of the polyethylene wax (a); in the following, the amounts of the grafting monomers per 100 parts of the wax (a) are shown in the parentheses.]. The resulting acrylonitrile-grafted polyethylene wax is designated as SW-1.

(2) Preparation of a toner and a copying test

Eighty-five parts of styrene/n-butyl methacrylate copolymer (Himer SBM-600, made by Sanyo Chemical Industry Co., Ltd.), 4 parts of SW-1, 9 parts of carbon black (Diablack SH, a product of Mitsubishi Chemical Co., Ltd.) and 2 parts of a gold-containing dye (Zapon Fast Black B made by BASF) were mixed in a ball mill for 24 hours, and then kneaded with a hot roll. After cooling, the mixture was pulverized and classified to form an electrostatic toner having a particle diameter of 13 to 15 micrometers. The electrostatic toner (120 parts) was mixed with 100 parts of an iron powder carrier having an average particle diameter of 50 to 80 micrometers to form a developer. By a conventional electrophotographic process, a latent electrostatic image was formed on a selenium photosensitive drum and developed with the resulting developer. The resulting toner image is transferred to a receptor sheet and heat-fixed by hot rolls at 180° C. Even after 5000 copies were continuously produced, clear soil-free copied images could be obtained without the offset phenomenon as in the early stage of the copying process. There was hardly any soiling of the hot rollers and the photosensitive drum.

EXAMPLE 2

(1) By the same procedure as in Example 1, (1), a styrene/acrylonitrile-grafted polyethylene wax containing 9.9 parts (12.1 parts) of an acrylonitrile component and 8.0 parts (9.7 parts) of a styrene components was produced by using 500 g of a polypropylene wax (homopolymer) having an intrinsic viscosity of 0.14 dl/g and obtained by polymerization with a Ziegler catalyst, 60 g of acrylonitrile, 55 g of styrene and 10.0 g of DTBPO except that the reaction temperature was changed to 170° C. The resulting modified polypropylene as is designated as SW-2.

(2) An electrostatic toner was prepared in the same way as in Example 1 using 7 parts of SW-2, 82 parts of Himer SBM-600, 9 parts of Diablack SH, and 2 parts of Zapon Fast Black. A developer was prepared from the resulting toner and the same carrier as used in Example 1 in the same way as in Example 1. The developer was subjected to the same copying test as used in Example 1. Even after 10000 copies were continuously produced, clear soil-free copied images without the offset phenomenon were obtained as in the early stage of the copying process. There was hardly any soiling of the hot rollers and the photosensitive drum.

After the fixing, a solid image area was subjected to 500 cycles of bending, and the degree of fixation was visually evaluated by peeling with an adhesive tape before and after the bending. It was found that there was hardly any change in the degree of fixation after the bending test, and the image had excellent bending resistance.

EXAMPLE 3

(1) By the same procedure as in Example 1, (1), a methacrylonitrile-grafted polypropylene wax (designated as SW-3) containing 8.3 parts (9.1 parts) of methacrylonitrile grafted thereto was prepared by using 500 g of a polypropylene wax having an intrinsic viscosity of 0.31 dl/g and an ethylene content of 3.2 mole % and obtained by polymerization with a Ziegler catalyst, 60 g of methacrylonitrile and 5.0 g of DTBPO except that the reaction temperature was changed to 170° C.

(2) A toner was prepared, and a copying test was performed, in the same way as in Example 1 except that SW-3 was used instead of SW-1.

Even after 5000 copies were continuously produced, clear soil-free copied images were obtained without the offset phenomenon as in the early stage of the copying process. There was hardly any soiling of the hot rollers and the photosensitive drum.

The flowability of the toner with temperature changes was examined. The toner was put onto a Petri dish, and its flowability was visually evaluated. It was found that the flowability of a toner sample kept at 50° C. for 48 hours was little different from that of a toner sample kept at room temperature for 48 hours, and that the toner had excellent flowability even at high temperatures.

EXAMPLE 4

(1) By the same procedure as in Example 1, (1), an acrylonitrile/vinyltoluene-grafted ethylene/4-methyl-1-pentene copolymer wax (designated as SW-4) containing 11.4 parts (14.9 parts) of acrylonitrile and 12.0 parts (15.7 parts) of vinyltoluene grafted thereto was prepared by using 500 g of an ethylene/4-methyl-1-pentene copolymer wax having an intrinsic viscosity of 0.21 dl/g and a 4-methyl-1-pentene content of 10 mole %, 70 g of acrylonitrile, 70 g of vinyltoluene and 11.5 g of DTBPO.

(2) A toner was prepared, and a copying test was performed, in the same way as in Example 1 except that SW-4 was used instead of SW-1.

Even after 5000 copies were continuously produced, clear soil-free copied images were obtained without the offset phenomenon as in the early stage of the copying process. There was hardly any soiling of the hot rollers and the photosensitive drum.

EXAMPLE 5

(1) By the same procedure as in Example 1, (1), an acrylonitrile-grafted polypropylene wax (designated as SW-5) containing 43.0 parts (75.4 parts) of acrylonitrile grafted thereto was prepared by using 500 g of a polypropylene wax (homopolymer) having an intrinsic viscosity of 0.22 dl/g and obtained by polymerization with a Ziegler catalyst, 500 g of acrylonitrile and 40 g of DTBPO except that the reaction temperature was changed to 170° C. and the dropwise addition time was changed to 6 hours.

(2) A toner was prepared, and a copying test was performed, in the same way as in Example 1 except that SW-5 was used instead of SW-1.

Even after 3000 copies were continuously produced, clear soil-free copied images were obtained without the offset phenomenon as in the early stage of the copying process. There was hardly any soiling of the hot rollers and the photosensitive drum.

The flowability of the toner was examined in the same way as in Example 3. It was found that a toner sample kept at 50° C. for 48 hours had slightly lower flowability than a toner sample kept at room temperaure for 48 hours, but that it did not produce agglomerates and had no problem in practical toner application.

EXAMPLE 6

(1) By the same procedure as in Example 1, (1), an acrylonitrile/styrene-grafted polybutene-1 wax (designated as SW-6) containing 10.5 parts (12.3 parts) of acrylonitrile and 4.0 parts (4.7 parts) of styrene grafted thereto was prepared by using 500 g of a polybutene-1 wax (homopolymer) having an intrinsic viscosity of 0.19 dl/g and obtained by polymerization with a Ziegler catalyst, 65 g of acrylonitrile, 23 g of styrene and 7.3 g of DTBPO.

(2) A toner was prepared, and a copying test was performed, in the same way as in Example 2 except that SW-6 was used instead of SW-2.

Even after 5000 copies were continuously produced, clear soil-free copied images were obtained without the offset phenomenon as in the early stage of the copying process. There was hardly any soiling of the hot rollers and the photosensitive drum.

The same bending test as in Example 2 was carried out. It was found that the degree of fixation before the bending test was maintained in a very high ratio after the bending test, and the fixed toner had excellent bending resistance.

EXAMPLE 7

(1) By the same procedure as in Example 1, (1), an acrylonitrile-grafted polypropylene wax (designated as SW-7) containing 6.2 parts (6.6 parts) of acrylonitrile grafted thereto was prepared by using 500 g of a polypropylene wax having an intrinsic viscosity of 0.41 dl/g, 40 g of acrylonitrile and 3.3 g of DTBPO.

(2) Forty-eight parts of a polyester resin (Himer ES 508, a product of Sanyo Chemical Industry Co., Ltd.), 2 parts of carbon black (MA-10, a product of Mitsubishi Chemical Industry Co., Ltd.), 48 parts of a magnetic powder (Mabiroblack BL-500, a product of Titanium Industry Co., Ltd.), and 2 parts of SW-7 were mixed in a ball mill for 24 hours, and then kneaded for 1 hour by a hot roll. The kneaded mixture was then finely pulverized by a jet mill, heat-treated by a spray dryer, and classified by a zigzag classifier to give a magnetic toner having an average diameter of 15 micrometers.

By a conventional electrophotographic process, a latent electrostatic image was formed on a selenium photosensitive drum, and developed with the resulting magnetic toner. The toner image was transferred to a receptor sheet, and then fixed by hot rollers kept at 200° C. When 5,000 copies were produced continuously, copied images of good quality were obtained without soiling of the hot rolls.

COMPARATIVE EXAMPLE 1

(1) By the same procedure as in Example 1, (1), an acrylonitrile-grafted polypropylene wax (designated as SW-8, grafted acrylonitrile (0.8 part)) was prepared by using 500 g of a polypropylene wax (homopolymer) having an intrinsic viscosity of 0.22 g/dl and obtained by polymerization with a Ziegler catalyst, 5.0 g of acrylonitrile and 0.5 g of DTBPO except that the reaction as carried out at 170° C. for 2 hours.

(2) A toner was prepared, and a copying test was performed, in the same way as in Example 2 except that SW-8 was used instead of SW-2.

In about the 4000th cycle of copying, the clearness of the images began to decrease. At the same time, a film of the polypropylene wax was seen to form partly on the surface of the photosensitive drum and the surfaces of the iron carrier particles (filming phenomenon).

When the same bending resistance test as in Example 2 was performed, the toner peeled markedly from the receptor sheet along the bended line. The results were thus inferior to those of Example 2.

COMPARATIVE EXAMPLE 2

(1) By the same procedure as in Example 1, an acrylonitrile-grafted polypropylene wax (designated as SW-9) containing 52.0 parts (108.3 parts) of acrylonitrile grafted thereto was prepared by adding 350 g of acrylonitrile and 18.5 g of DTBPO to 300 g of a polyethylene wax having an intrinsic viscosity of 0.11 dl/g, and heating the mixture at 160° C. for 8 hours.

(2) A toner was prepared, and a copying test was performed, in the same way as in Example 2 except that SW-9 was used instead of SW-2. It was found that the releasability of the toner image from the hot rollers was inferior, and the offset phenomenon and soiling of the receptor sheets were observed.

In the same way as in Example 3, the flowability of the toner with temperature changes was examined. It was found that a toner sample kept at 50° C. developed agglomerated masses having a size of more than 5 mm in one side and had poor flowability unsuitable for practical toner application.

COMPARATIVE EXAMPLE 3

(1) A polypropylene wax having an intrinsic viscosity of 0.03 dl/g was prepared by charging polypropylene having an intrinsic viscosity of 1.36 dl/g and an ethylene content of 3.2 mole % into a 1-liter autoclave, and thermally decomposing it at 340° C. for 13.5 hours while passing a minute amount of nitrogen through the autoclave.

An acrylonitrile-grafted polypropylene wax (designated as SW-10) containing 14.7 parts (17.2 parts) of acrylonitrile grafted thereto was prepared by using the resulting polypropylene wax and acrylonitrile in the same way as in Example 1.

(2) A toner was prepared, and a copying test was performed, in the same way as in Example 1 except that SW-10 was used instead of SW-1.

The releasability of the toner image from the hot rollers was very poor, and a marked filming phenomenon was observed at the photosensitive drum and the iron carrier particles.

COMPARATIVE EXAMPLE 4

(1) An acrylonitrile-grafted polyethylene wax (designated SW-11) containing 11.8 parts (13.4 parts) of acrylonitrile grafted thereto was prepared in the same way as in Example 1 by adding 70 g of acrylonitrile and 5.8 g of DTBPO to 500 g of a polyethylene wax having an intrinsic viscosity of 1.25 dl/g and heating the mixture at 180° C. for 2 hours.

(2) A toner was prepared, and a copying test was carried out through 1000 cycles, in the same way as in Example 1 except that SW-11 was used instead of SW-1.

The releasability of the toner image from the hot rollers was inferior and the offset phenomenon and soiling of the receptor sheets were observed.

COMPARATIVE EXAMPLE 5

Three hundred grams of the polypropylene used to prepare SW-10 in Comparative Example 3 was charged into a 1-liter autoclave and thermally decomposed at 340° C. for 2.2 hours while passing a minute nitrogen into the autoclave. The resulting polypropylene wax had an intrinsic viscosity of 0.10 dl/g.

A toner was prepared, and a copying test was performed, in the same way as in Example 2 except that the resulting polypropylene wax was used instead of SW-2.

The clearness of the toner image began to decrease approximately in the 3500th cycle of copying, and at the same time, a film of the polypropylene wax was seen to form partly on the surface of the photosensitive drum and the surfaces of the iron carrier particles (filming phenomenon).

The flowability of the toner with temperature changes was examined in the same way as in Example 3. A sample of the toner kept at 50° C. developed agglomerated particles having a size of about 5 mm at one side, and the toner had very poor flowability unsuitable for practical toner application.

EXAMPLE 8

By the same procedure as in Example 1, an electrostatic toner was prepared from 100 parts of the acrylonitrile/styrene-grafted polybutene-1 wax prepared in Example 6, 5 parts of carbon black (Diablack SH, a product of Mitsubishi Chemical Industry Co., Ltd.), and 2 parts of a gold-containing dye (Zapon Fast Black B of BASF). Then, 120 parts of the electrostatic toner was mixed with 100 parts of an iron powder carrier having an average particle diameter of 50 to 80 micrometers to form a developer.

By a conventional electrophotographic process, a latent electrostatic image was formed on a selenium photosensitive drum and developed with the developer. The toner image was transferred to a receptor sheet and heat-fixed by hot rollers. Even after 200 cycles of copying, clear copied images free from soiling as in the initial stage of the copying process were obtained without the offset phenomenon. Soiling of the hot rollers and the photosensitive drum was not observed.

EXAMPLE 9

In the same way as in Example 8, an electrostatic toner (containing a carrier) was prepared by pulverizing and kneading 50 parts of SW-1 obtained in Example 1, 50 parts of low-molecular-weight polystyrene (Himer ST-95, a product of Sanyo Chemical Industry Co., Ltd.), 5 parts of the same carbon black as used in Example 1 and 2 parts of the same gold-containing dye as used in Example 1. In the same way as in Example 8, a copying test was performed through 10000 cycles using the resulting electrostatic toner. Clear copied images free from soiling as in the early stage of the copying process were obtained without the offset phenomenon. No soiling of the hot rollers and the photosensitive drum was observed.

COMPARATIVE EXAMPLE 6

An electrostatic toner was prepared in the same way as in Example 8 except that low-molecular-weight polystyrene (Himer ST-95, a product of Sanyo Chemical Industry Co., Ltd.) was used instead of SW-6. In the same way as in Example 8, a copying test as performed through 1000 cycles using the resulting electrostatic toner. The releasability of the toner image from the hot rollers was poor, and the offset phenomenon and the soiling of the receptor sheets were noted.

EXAMPLE 10

Forty parts of SW-1 used in Example 1, 10 parts of an ethylene/vinyl acetate copolymer (Evaflex 460, a product of Mitsui-Du Pont Polychemicals Co., Ltd.), 2 parts of carbon black (MA-10, a productof Mitsubishi Chemical Industry Co., Ltd.), and 50 parts of a magnetic powder (Mabiroblack BL-500, a product of Titanium Industry Co., Ltd.) were mixed in a ball mill for 24 hours, and then kneaded for 1 hour by a hot roll. The kneaded mixture was then finely pulverized by a jet mill, heat-treated by a spray dryer, and classified by a zigzag classifier to give a magnetic tonerhaving an average diameter of 15 micrometers. meters.

By a conventional electrophotographic process, a latent electrostatic image was formed on a selenium photosensitive drum, and developed with the resulting magnetic toner. The toner image was transferred to a receptor sheet, and then fixed by hot rollers kept at 200° C. When 5,000 copies were produced continuously, copied images of good quality could be obtained without soiling of the hot rolls and the photosensitive drum.

EXAMPLE 11

A magnetic toner was prepared in the same way as in Example 10 except that a mixture of 25 parts of SW-1 and 25 parts of the same low-molecular-weight polystyrene as used in Example 9 was used instead of 40 parts of SW-1. A copying test wa conducted through 2000 cycles in the same way as in Example 10. Copied images of good quality were obtained without soiling of the hot rollers and photosensitive drum.

COMPARATIVE EXAMPLE 7

A magnetic toner was prepared in the same way as in Example 10 except that the same low-molecular-weight polystyrene as used in Comparative Example 6 was used instead of SW-1. A copying test was conducted in the same way as in Example 10. After 1000 cycles, the hot rolls were soiled, and the copied image became obscure.

EXAMPLE 12

A toner was prepared in the same way as in Example 10 except that SW-5 was used instead of SW-1. Using the resulting toner, a copying test was conducted through 5000 cycles. Even after the 5000 cycles, copied images of good quality were obtained without the soiling of the hot rollers and the photosensitive drums.

EXAMPLE 13

(1) Preparation of an unsaturated carboxylate-grafted polyolefin wax

Five hundred grams of a polyethylene wax (homopolymer) having an instrinsic viscosity of 0.23 dl/g and obtained by polymerization with Ziegler catalyst was charged into a 1.5-liter glass reactor, and melted at 160° C. Then, 105 g of 2-ethylhexyl methacrylate and 8.8 g of DTBPO were added, and the mixture was heated for 3 hours. While the mixture was in the molten state, it was subjected to a deaerating treatment for 1 hour in vacuum at 10 mmHg to remove the volatile components. The residue was then cooled, and 20 g of it was dissolved in 200 ml of p-xylene. The solution was added with stirring to 600 ml of methyl ethyl ketone. The solid portion that precipitated was washed twice with 500 ml of methyl ethyl ketone, and dried. The 2-ethylhexyl methacrylate content of the resulting solid portion was subjected to $^1$H-NMR to determine its 2-ethylhexyl methacrylate content. The amount of 2-ethylhexyl methacrylate grafted, so determined, was 16.3 parts by weight per 100 parts by weight of the 2-ethylhexyl methacrylate-grafted polyethylene wax. The resulting grafted polyethylene wax is designated as MW-1.

(2) Preparation of a toner and a copying test

Eighty-five parts of styrene/n-butyl methacrylate copolymer (Himer SBM-600, made by Sanyo Chemical Industry Co., Ltd.), 4 parts of MW-1, 9 parts of carbon black (Diablack SH, a product of Mitsubishi Chemical Co., Ltd.) and 2 parts of a gold-containing dye (Zapon Fast Black B made by BASF) were mixed in a ball mill for 24 hours, and then kneaded with a hot roll. After cooling, the mixture was pulverized and classified to form an electrostatic toner having a particle diameter of 13 to 15 micrometers. The electrostatic toner (2 parts) was mixed with 100 parts of an iron powder carrier having an average particle diameter of 50 to 80 micrometers to form a developer. By a conventional electrophotographic process, a latent elecrostatic image was formed on a selenium photosensitive drum and developed with the resulting developer. The resulting toner image is transferred to a receptor sheet and heat-fixed by hot rolls at 200° C. Even after 5000 copies were continuously produced, clear soil-free copied images could be obtained without the offset phenomenon as in the early stage of the copying process. No soiling of the hot rollers and the photosensitive drum was observed.

EXAMPLE 14

A styrene/2-ethylhexylacrylate-grafted polypropylene wax (designated as MW-2) containing 10.3 parts of a 2-ethylhexyl acrylate component and 8.9 parts of a styrene component was prepared in he same way as in Example 13 by adding 60 g of 2-ethylhexyl acrylate, 55 g of styrene and 10.0 g of DTBPO to 500 g of a polypropylene wax (homopolymer) having an intrinsic viscosity of 0.14 dl/g obtained by polymerization with a Ziegler catalyst, and heating the mixture at 170° C. for 3 hours.

A toner was prepared in the same way as in Example 13 from 7 parts of MW-2, 82 parts of Himer SBM-600, 9 parts of Diablack SH and 2 parts of Zapon Fast Black, and a copying test was conducted using the toner in the same way as in Example 13. Even after 10,000 cycles of copying, clear soil-free copied images were obtained without the offset phenomenon as in the early stage of the electrophoto graphic process. No soiling of the hot rollers and the photosensitive drum was observed.

The same bending test as in Example 2 was carried out. The degree of fixation of the toner image remained substantially unchanged after the bending test, and the fixed toner image was found to have excellent bending resistance.

EXAMPLE 15

By the same procedure as in Example 13, (1), an n-butylmethacrylate-grafted polypropylene wax (designated as MW-3) containing 9.1 parts of n-butyl methacrylate grafted thereto was prepared by adding 60 g of n-butyl methacrylate and 5.0 g of DTBPO to 500 g of a polypropylene wax having an intrinsic viscosity of 0.31 dl/g and an entent of 3.2 mole % and obtained by polymerization with a Ziegler catalyst, and heating the mixture at 170° C. for 3 hours.

A toner was prepared, and a copying test was performed, in the same way as in Example 13 except that MW-3 was used instead of MW-1.

Even after 5000 copies were continuously produced, clear soil-free copied images were obtained without the offset phenomenon as in the early stage of the copying process. No soiling of the hot rollers and the photosensitive drum was observed.

The flowability of the toner was examined in the same wwy as in Example 3. It was found that the flowability of a toner sample kept at 50° C. for 48 hours was little different from that of a toner sample kept at room temperature for 48 hours, and that the toner had excellent flowability even at high temperatures.

EXAMPLE 16

By the same procedure as in Example 13, (1), a diethyl itaconate/vinyltoluene-grafted polyethylene wax (designated as MW-4) containing 11.4 parts of diethyl itaconate and 12.0 parts of vinyltoluene grafted thereto was prepared by adding 70 g of diethyl itaconate, 70 g of vinyltoluene and 11.5 g of DTBPO to 500 g of a polyethylene wax having an intrinsic viscosity of 0.11 g/dl and a propylene content of 1.6 mole %, and heating the mixture at 160° C. for 3 hours.

A toner was prepared, and a copying test as performed, in the same way as in Example 13 except that MW-4 was used instead of MW-1.

Even after 5000 cycles of copying, clear soil-free copied images were obtained without the offset phenomenon as in the early stage of copying. No soiling of the hot rollers and the photosensitive drum was observed.

EXAMPLE 17

By the same procedure as in Example 13, (1), a diethyl maleate/styrene-grafted polyethylene wax (designated as MW-5) containing 9.7 parts of diethyl maleate and 11.2 parts of styrene grafted thereto was prepared by adding 60 g of diethyl maleate, 65 g of styrene and 10.0 g of DTBPO to 500 g of a polypropylene wax homopolymer having an intrinsic viscosity of 0.22 dl/g and obtained by polymerization with a Ziegler catalyst and heating the mixture at 170° C. for 3 hours.

A toner was prepared, and a copying test as performed, in the same way as in Example 13 except that MW-5 was used instead of MW-1.

Even after 3000 cycles of copying, clear soil-free copied images were obtained without the offset phenomenon as in the early stage of copying. No soiling of the hot rollers and the photosensitive drum was observed.

The flowability of the toner was examined in the same way as in Example 3. It was found that a toner sample kept at 50° C. for 48 hours had slightly lower flowability than a toner sample kept at room temperaure for 48 hours, but that it did not produce agglomerates and had no problem in practical toner applications.

EXAMPLE 18

By the same procedure as in Example 13, (1), an n-butyl methacrylate/styrene-grafted polybutene-1 wax (designated as MW-6) containing 11.6 parts of n-butyl methacrylate and 4.2 parts of styrene grafted thereto was prepared by adding 65 g of n-butyl methacrylate, 23 g of styrene and 7.3 g of DTBPO to 500 g of a polybutene-1 wax (homopolymer) having an intrinsic viscosity of 0.19 dl/g and obtained by polymerization with a Ziegler catalyst and heating the mixture at 160° C. for 3 hours.

A toner was prepared, and a copying test as performed, in the same way as in Example 14 except that MW-6 was used instead of MW-2.

Even after 5000 cycles of copying, clear soil-free copied images were obtained without the offset phenomenon as in the early stage of copying. No soiling of the hot rollers and the photosensitive drum was observed.

The same bending test as in Example 2 was carried out. It was found that the degree of fixation before the bending test was maintained in a very high ratio after the bending test, and the fixed toner had excellent bending resistance.

EXAMPLE 19

By the same procedure as in Example 13, 40 g of 2-hydroxyethyl methacrylate and 3.3 g of DTBPO were added to 500 g of polyethylene wax having an intrinsic viscosity of 0.41 g/dl, and the mixture was reacted at 170° C. for 4 hours to give 2-hydroxyethyl methacrylate-grafted polyethylene wax (MW-7) containing 6.4 parts by weight of 2-hydroxyethyl methacrylate grafted.

Then, 48 parts of styrene/n-butyl acrylate copolymer (Himer SBM-700), 2 parts of carbon black (MA-100), 48 parts of a magnetic powder (Mabiroblack BL-500) and 2 parts of MW-7 were mixed in a ball mill for 24 hours, and kneaded for 1 hour by hot rolls. The kneaded mixture was finely pulverized by a jet mill, heat-treated by a spray dryer, and classified by a zigzag classifier to form a magnetic toner having an average particle diameter of 15 micrometers.

By a conventional electrophotographic process, a latent electrostatic image was formed on a selenium photosensitive drum, and developed with the resulting magnetic toner. The toner image was transferred onto a receptor sheet, and fixed by hot rollers kept at 200° C. The copying process was carried out through 5000 cycles, and copied images of good quality were obtained without the soiling of the hot rollers.

COMPARATIVE EXAMPLE 8

(1) By the same procedure as in Example 13, (1), a diethyl maleate-grafted polypropylene wax (designated as MW-8) containing 0.9 part of diethyl maleate grafted thereto was prepared by adding 5.0 g of diethyl maleate and 0.5 g of DTBPO to 500 g of a polypropylene wax (homopolymer) having an intrinsic viscosity of 0.22 dl/g obtained by polymerization with a Ziegler catalyst and heating the mixture at 170° C. for 2 hours.

(2) A toner was prepared, and a copying test was performed, in the same way as in Example 14 except that MW-8 was used instead of MW-2.

In about the 4000th cycle of copying, the clearness of the images began to decrease. At the same time, a film of the polypropylene wax was seen to form partly on the surface of the photosensitive drum and the surfaces of the iron carrier particles (filming phenomenon).

When the same bending resistance test as in Example 2 was performed, the toner peeled markedly from the receptor sheet along the bended line. The results were thus inferior to those of Example 14.

COMPARATIVE EXAMPLE 9

(1) By the same procedure as in Example 13, a 2-ethylhexyl methacrylate-grafted polyethylene wax (designated as MW-9) containing 32.8 parts of 2-ethylhexyl methacrylate grafted thereto was prepared by adding 150 g of 2-ethylhexyl methacrylate and 8.5 g of DTBPO to 300 g of a polyethylene wax having an intrinsic viscosity of 0.11 dl/g, and heating the mixture at 160° C. for 8 hours.

(2) A toner was prepared, and a copying test was performed, in the same way as in Example 14 except that MW-9 was used instead of MW-2. It was found that the releasability of the toner image from the hot rollers was inferior, and the offset phenomenon and soiling of the receptor sheets were observed.

In the same way as in Example 3, the flowability of the toner with temperature changes was examined. It was found that a toner sample kept at 50° C. developed agglomerated masses having a size of more than 5 mm in one side and had poor flowability unsuitable for practical toner application.

COMPARATIVE EXAMPLE 10

(1) Polypropylene having an intrinsic viscosity of 1.36 dl/g and an ethylene content of 3.2 mole % was charged into a 1-liter autoclave, and thermally decomposing it at 340° C. for 3.5 hours while passing a minute amount of nitrogen through the autoclave.

A 2-ethylhexyl methacrylate-grafted polypropylene wax (designated as MW-10) containing 9.2 parts of 2-ethylhexyl methacrylate grafted thereto was prepared by using the resulting polypropylene wax and 2-ethylhexyl methacrylate in the same way as in Example 13.

(2) A toner was prepared, and a copying test was performed, in the same way as in Example 13 except that MW-10 was used instead of MW-1.

The releasability of the toner image from the hot rollers was very poor, and a marked filming phenomenon was observed at the photosensitive drum and the iron carrier particles.

COMPARATIVE EXAMPLE 11

(1) By the same procedure as in Example 13, (1), a 2-ethylhexyl acrylate-grafted polyethylene containing 11.8 parts of 2-ethylhexyl acrylate grafted was prepared by adding 70 g of 2-ethylhexyl acrylate and 5.8 g of DTBPO and heating the mixture at 180° C. for 2 hours.

(2) A toner was prepared, and a copying test was carried out through 1000 cycles, in the same way as in Example 1 except that SW-11 was used instead of SW-1.

The releasability of the toner image from the hot rollers was inferior and the offset phenomenon and soiling of the receptor sheets were observed.

COMPARATIVE EXAMPLE 12

Three hundred grams of the polypropylene used to prepare MW-10 in Comparative Example 10 was charged into a 1-liter autoclave and thermally decomposed at 340° C. for 2.2 hours while passing a minute nitrogen into the autoclave. The resulting polypropylene wax had an intrinsic viscosity of 0.10 dl/g.

A toner was prepared, and a copying test was performed, in the same way as in Example 14 except that the resulting polypropylene wax was used instead of MW-2.

The clearness of the toner image began to decrease approximately in the 3500th cycle of copying, and at the same time, a film of the polypropylene wax was seen to form partly on the surface of the photosensitive drum and the surfaces of the iron carrier particles (filming phenomenon).

The flowability of the toner with temperature changes was examined in the same way as in Example 3. A sample of the toner kept at 50° C. developed agglomerated particles having a size of about 5 mm at one side, and the toner had very poor flowability unsuitable for practical toner application.

EXAMPLE 20

(1) Preparation of an unsaturated carboxylate-grafted polyolefin wax

A 1.5-liter glass reactor was charged with 500 g of a polyethylene wax (homopolymer) having an intrinsic viscosity of 0.23 dl/g, and melted at 160° C. in an atmosphere of nitrogen. Then, 300 g of dibutyl fumarate and 25.1 g of DTBPO were continuously fed into the reaction system (at 160° C.) over 4 hours. The mixture was heated further for 2 hours, and while the reaction mixture was in the molten state, it was subjected to a deaeration treatment in vacuum at 10 mmHg for 1 hour to remove the volatile components. The residue was cooled, and 20 g of the cooled product was dissolved in p-xylene. The solution was added with stirring to 600 ml of methyl ethyl ketone. The precipitated solid portion was washed twice with 500 ml of methyl ethyl ketone, and dried. The resulting solid portion was analyzed by $^1$H-NMR for its dibutyl fumarate content. The amount of dibutyl fumarate grafted, so determined, was 45.1 parts per 100 parts by weight of the dibutyl fumarate-grafted polyethylene wax. The grafted polyethylene wax is designated as EW-1.

(2) Preparation of a toner and a copying test

One hundred parts of the modified polyethylene wax (EW-1), 5 pars of carbon black (Diablack SH, a product of Mitsubishi Chemical Industry Co., Ltd.) and 2 parts of a gold-containing dye (Zapon Fast Black, a product of BASF) were mixed in a ball mill for 24 hours. The mixture was kneaded by a hot roll, cooled, pulverized and classified to prepare an electrostatic toner having a particle diameter of 13 to 15 micrometers. The electrostatic toner (120 parts) was mixed with 100 parts of an iron powder carrier having an average particle diameter of 50 to 80 micrometers to form a developer.

By a conventional electrophotographic process, a latent electrostatic image was formed on a selenium photosensitive drum and developed with the developer. The toner image was transferred to a receptor sheet and heat-fixed by hot rollers at 200° C. Even after 5000 cycles of copying, clear soil-free copied images were obtained without the offset phenomenon as in the early stage of the copying processs. No soiling of the hot rollers and the photosensitive drum was noted (see Table 1).

EXAMPLE 21

(1) By the same procedure as in Example 20, a dibutyl fumarate/styrene-grafted polyethylene wax (designated as EW-2) containing 32.7 parts of a dibutyl fumarate component and 12.3 parts of styrene grafted thereto was prepared by using the polyethylene wax obtained in Example 20 as a starting material.

A toner was prepared in the same way as in Example 20 from 50 parts of EW-2, 50 parts of a styrene/n-butyl methacrylate copolymer (Himer SBM-600, a product of Sanyo Chemical Industry Co., Ltd.), 5 parts of the same carbon black as used in Example 20 and 2 parts of the same gold-containing dye as used in Example 20. A copying test was performed by using the resulting toner in the same wa as in Example 20 (see Table 1).

Even after the 10,000th cycles of copying, clear soil-free copied images were obtained without the offset phenomenon as in the early stage of the copying process. No soiling of the hot rollers and the photosensitive drum was noted.

The same bending test as in Example 2. The degree of fixing of the toner image remained substantially unchanged after the bending test, and the fixed image was found to have excellent bending resistance.

EXAMPLES 22–28

By the same procedure as in Example 20, modified polyolefin waxes (EW-3 to EW-9) were synthesized, and toners having the compositions shown in Table 1 were prepared in the same way as in Example 20.

The same copying test as in Example 20 was conducted using these toners. In all runs, even after 5000 cycles of copying, clear soil-free copied images were obtained without the offset phenomenon. No soiling of the hot rollers and the photosensitive drum was noted.

The flowability of the toner was examined in the same way as in Example 3. It was found that the flowability of a toner sample kept at 50° C. for 48 hours was little different from that of a toner sample kept at room temperature for 48 hours, and that the toner had excellent flowability even at high temperatures.

COMPARATIVE EXAMPLES 13–17

By the same procedure as in Example 20, the modified polyolefin waxes (EW-10 to EW-13) as shown in Table 1 were synthesized. In Comparative Example 17, EW-1 synthesized in Example 20 was used.

Toners having the compositions shown in Table 1 were prepared in the same way as in Example 20, and the same copying test as in Example 20 was conducted using these toners.

As a result, the clearness of the image began to decrease approximately in the 4000th cycle in all runs. When the same bending test as in Example 21 was carried out, the toner markedly peeled alone the bent line, and the results were inferior to those obtained in Example 21.

TABLE 1

| | Modified polyolefin wax | | | | | | |
|---|---|---|---|---|---|---|---|
| | Starting wax | | | Unsaturated carboxylic acid ester | | Other vinyl monomer | |
| Run | Type | | [η] | Type | Amount grafted (parts) | Type | Amount grafted (parts) |
| Example | | | | | | | |
| 20 | Polyethylene wax | | 0.23 | Dibutyl fumarate | 45.1 | — | — |
| 21 | Polyethylene wax | | " | Dibutyl fumarate | 32.7 | Styrene | 12.3 |
| 22 | Polyethylene wax | | " | 2-Ethylhexyl methacrylate | 16.3 | — | — |
| 23 | Polypropylene wax | | 0.14 | 2-Ethylhexyl acrylate | 19.8 | Styrene | 20.4 |
| 24 | Propylene/ethylene co-polymer wax (ethylene | | 0.31 | n-Butyl methacrylate | 48.3 | — | — |

TABLE 1-continued

| | | content 3.2 mole %) | | | | | |
|---|---|---|---|---|---|---|---|
| 25 | | Ethylene/propylene copolymer wax (propylene content 1.6 mole %) | 0.11 | Diethyl itaconate | 23.5 | Vinyltoluene | 8.7 |
| 26 | | Polypropylene wax | 0.22 | Diethyl maleate | 40.1 | Styrene | 5.0 |
| 27 | | Polybutene-1 wax | 0.19 | n-Butyl methacrylate | 25.0 | Styrene Methacrylic acid | 5.0 2.0 |
| 28 | | Ethylene/4-methylpentene-1 copolymer wax (4-methyl-pentene content 10 mole %) | 0.41 | 2-Hydroxyethyl methacrylate | 19.7 | Styrene | 15.3 |
| Comparative Example | | | | | | | |
| 13 | | Polyethylene wax | 0.23 | Dibutyl fumarate | less than 2 | — | — |
| 14 | | Polyethylene wax | " | Dibutyl fumarate | 76.8 | — | — |
| 15 | | Polyethylene wax | 0.03 | Dibutyl fumarate | 43.7 | — | — |
| 16 | | Polyethylene wax | 1.3 | Dibutyl fumarate | 40.2 | — | — |
| 17 | | Polyethylene wax | 0.23 | Dibutyl fumarate | 45.1 | — | — |

| Run | Wax designation | Toner composition (parts) (*) | | | |
|---|---|---|---|---|---|
| | | Modified wax | Other resin | Carbon black | Gold-containing due |
| Example | | | | | |
| 20 | EW-1 | 100 | — | 5 | 2 |
| 21 | EW-2 | 50 | 50 (Himer SBM) | 5 | 2 |
| 22 | EW-3 | 40 | 60 (Himer SBM) | 5 | 2 |
| 23 | EW-4 | 80 | 20 (Himer SBM) | 5 | 2 |
| 24 | EW-5 | 100 | — | 8 | 2 |
| 25 | EW-6 | 40 | 60 (Himer SBM) | 5 | 2 |
| 26 | EW-7 | 100 | — | 7 | 4 |
| 27 | EW-5 | 100 | — | 5 | 2 |
| 28 | EW-9 | 100 | — | 5 | 2 |
| Comparative Example | | | | | |
| 13 | EW-10 | 100 | — | 5 | 2 |
| 14 | EW-11 | 100 | — | 5 | 2 |
| 15 | EW-12 | 100 | — | 5 | 2 |
| 16 | EW-13 | 100 | — | 5 | 2 |
| 17 | EW-1 | 23 | 77 (Himer SBM) | 5 | 2 |

(*): 100 Parts of an iron powder carrier was used per 120 parts of the toner.

EXAMPLE 29

Fifty parts of EW-1 synthesized in Example 20, 2 parts of carbon black (MA-100, a product of Mitsubishi Chemical Industry Co., Ltd.) and 48 parts of a magnetic powder (Mabiroblack BL-500, a product of Titanium Industry Co., Ltd.) were mixed in a ball mill for 24 hours, and kneaded by a hot roll for 1 hour. The kneaded mixture was finely pulverized by a jet mill, heat-treated by a spray dryer and classified by a zigzag classifier to give a magnetic toner having an average particle diameter of 15 micrometers.

By a conventional electrophotographic process, a latent electrostatic image was formed on a selenium photosensitive drum and developed with the magnetic toner. The toner image was transferred to a receptor sheet and heat-fixed by a hot rollers kept at 200° C. Under these conditions, the copying process was continuously carried out through 5000 cycles. Copied images of good quality were obtained without soiling of the hot rollers.

EXAMPLE 30

(1) Preparation of a polypropylene waxcontaining carboxyl groups

Five hundred grams of a polypropylene wax (homopolymer) having an intrinsic viscosity of 0.27 dl/g and obtained by polymerization with a Ziegler catalyst was charged into a 1.5-liter glass reactor, and melted at 170° C. Then, 26.3 g of maleic anhydride and 2.63 g of DTBPO were added, and the mixture was heated for 5 hours. While the reaction mixture was in the molten state, it was subjected to a deaerating treatment in vacuum at 5 mmHg for 1 hour to remove the volatile components. The residue as cooled. The resulting maleic anhydride-grafted polypropylene wax had an acid number of 29.6 mg-KOH/g and an intrinsic viscosity of 0.17 dl/g, and is designated as MU-1. The amount of maleic anhydride grafted was 2.6 g per 100 g of the modified polypropylene wax.

(2) Preparation of a toner and a copying test

Eighty-five parts of styrene/n-butyl methacrylate copolymer (Himer SBM-600, a product of Sanyo Chemical Industry Co., Ltd.), 4 parts of MU-1, 9 parts of carbon black (Diablack SH, a product of Mitsubishi Chemical Industry Co., Ltd.) and 2 parts of a gold-containing dye (Zapon Fast Black B, a product of BASF) were mixed in a ball mill for 24 hours, and then kneaded by a hot roll. After cooling, the kneaded mixture was pulverized and classified to prepare an electrostatic toner having a particle diameter of 13 to 15 micrometers. The resulting electrostatic toner (2 parts) was mixed with 100 parts of an iron powder carrier to form a developer.

By a conventional electrophotographic process, a latent electrostatic image was formed on a selenium photosensitive drum, and developed with the developer. The toner image was transferred to a receptor sheet and heat-fixed by hot rollers kept at 200° C. Even after 5000 cycles of copying, clear soil-free copied images were obtained without the offset phenomenon as in the early stage of the copying process. There was observed scarcely any soiling of the hot rollers and the photosensitive drum.

The flowability of the toner was examined in the same way as in Example 3. It was found that the flowability of a toner sample kept at 50° C. for 48 hours was little different from that of a toner sample kept at room temperature for 48 hours, and that the toner had excellent flowability even at high temperatures.

EXAMPLE 31

A maleic anhydride-grafted polypropylene wax (MU-2) containing 11.3% by weight of maleic anhydride and having an acid number of 126 mg-KOH/g and an intrinsic viscosity of 0.23 dl/g was prepared by the same method as in Example 30 by adding 75 g of maleic anhydride and 18 g of DTBPO to the polypropylene wax.

Seven parts of MU-2, 82 parts of Himer SBM-600, 9 parts of Diablack SH and 2 parts of Zapon Fast Black were mixed in the same way as in Example 30 to form a toner. A copying test was carried out by using the toner in the same way as in Example 30. Even after 10,000 cycles of copying, clear soil-free copied images were obtained without the offset phenomenon as in the early stage of the copying process. Scarcely any soiling of the hot rollers and the photosensitive drum was observed.

The same bending test as in Example 2 was conducted. The degree of fixing of the toner image remained substantially unchanged after the bending test, and the fixed toner image had excellent bending resistance.

EXAMPLE 32

By the same method as in Example 30, a crotonic acid-grafted polypropyelne wax (MU-3) containing 10.2% by weight of crotonic acid and having an acid number of 57.0 mg-KOH/g and an intrinsic viscosity of 0.21 dl/g was prepared by adding 100 g of crotonic acid and 10 g of DTBPO to the polypropylene wax.

A toner was prepared, and a copying test was performed, in the same way as in Example 30 except that MU-3 was used instead of MU-1.

Even after 5000 cycles of copying, clear soil-free copied images were obtained without the offset phenomenon. There was observed scarcely any soiling of the hot rollers and the photosensitive drum.

The flowability of the toner was examined in the same way as in Example 3. It was found that the flowability of a toner sample kept at 50° C. for 48 hours was little different from that of a toner sample kept at room temperature for 48 hours, and that the toner had excellent flowability even at high temperatures.

EXAMPLE 33

Three hundred grams of polypropylene having an intrinsic viscosity of 1.36 dl/g and an ethylene content of 3.2 mole % was mixed with 5.0 g of maleic anhydride and 7 g of DTBPO and the mixture was reacted at 260° C. in an extruder having a screw diameter of 20 mm. The resulting maleic anhydride-grafted polypropyelne wax contained 1.3% by weight of maleic anhydride grafted and had an acid number of 14.8 mg-KOH/g and an intrinsic viscosity of 0.41 dl/g.

A toner was prepared, and a copying test was performed, in the same way as in Example 30 except that MU-4 was used instead of MU-1.

Even after 2000 cycles of copying, clear soil-freed copied images were obtained without the offset phenomenon as in the early stage of the copying processs. Scarcely any soiling of the hot rolls and the photosensitive drum was observed.

EXAMPLE 34

In the same way as in Example 33, a 5-norbornene-2,3-dicarboxylic anhydride-grafted polybutene wax (designated as MU-5) containing 2.1% by weight of 5-norbornene-2,3-dicarboxylic anhydride and having an acid number of 14.0 mg-KOH/g and an intrinsic viscosity of 0.27 dl/g was prepared by mixing 300 g of polybutene having an intrinsic viscosity of 4.86 dl/g with 9 g of 5-norbornene-2,3-dicarboxylic anhydride and 9 g of 2,5-dimethyl-2,5-t-butylperoxy-hexyne-3, and reacting the mixture.

A toner was prepared, and a copying test was carried out, in the same way as in Example 30 except that MU-5 was used instead of MU-1.

Even after 2000 cycles of copying, clear soil-free copied images were obtained without the offset phenomenon as in the early stage of the copying process. Scarcely any soiling of the hot rollers and the photosensitive drum was observed.

The same bending test as in Example 31 was carried out. The results were slightly inferior to those obtained in Example 31, but were on a level free from any problem in practical applications.

EXAMPLE 35

Three hundred grams of a powder of polypropylene (homopolymer) having an intrinsic viscosity of 1.36 dl/g was charged into a 2-liter stainless steel autoclave, and oxidized for 16 hours with stirring while maintaining the temperature of the oil bath at 130° C. and passing hot air at a rate of 5 liters/min. The resulting oxidized polypropylene wax (MU-6) had an acid number of 18.1 mg-KOH/g and an intrinsic viscosity of 0.11 dl/g.

A toner was prepared, and a copying test was conducted, in the same way as in Example 31 except that MU-6 was used instead of MU-2.

The flowability of the toner was examined in the same way as in Example 3. It was confirmed that the toner had excellent flowability at high temperatures.

EXAMPLE 36

An oxidized polypropylene wax (MU-8) having an acid number of 9.3 mg-KOH/g and an intrinsic viscosity of 0.22 dl/g was prepared in the same way as in Example 35 by performing the oxidation reaction for 6 hours.

Forty-eight parts of a styrene/n-butyl methacrylate copolymer (Himer SBM700, a product of Sanyo Chemical Industry Co., Ld.), 2 pars of carbon black (MKA-100, a product of Mitsubishi Chemical Industry Co., Ltd.), 48 parts of a magnetic powder (Mabiroblack BL-500, a product of Titanium Industry Co., Lgtd.), and 2 parts of MU-8 were mixed in a ball mill for 24 hours, and then kneaded by a hot roller for 1 hour. The kneaded mixture was finely pulverized by a jet mill, heat-treated by a spray dryer, and classified by a zigzag classifier to give a magnetic toner having an average particle diameter of 15 micrometers. meters.

By a conventional electrophotographic process, a latent electrostatic image was formed on a selenium photosensitive drum and developed with the magnetic toner. The toner image was transferred to a receptor sheet, and heat-fixed by hot rollers kept at 200° C. Under these conditions, the copying process was carried out continuously through 5000 cycles. Copied images of good quality were obtained without the soiling of the hot rollers.

EXAMPLE 37

A maleic anhydride-grafted 4-methyl-1-pentene/1-hexene copolymer wax (MU-7) containing 3.1% by weight of maleic anhdyride grafted and having an acid number of 35.3 mg-KOH/g and an intrinsic viscosity of 0.23 was prepared by the same reaction as in Example 30 using 500 g of a 4-methyl-1-pentene/1-hexene copolymer wax having a 1-hexene content of 35 mole % and an intrinsic viscosity of 0.22 dl/g and obtained by polymerization with a Ziegler catalyst, 20.0 g of maleic anhydride and 2.0 g of DBPO.

Forty-eight parts of styrene/n-butyl methacrylate copolymer (Himer SBM700, a product of Sanyo Chemical Industry Co., Ltd.), 2 parts of carbon black (MA-100, a product of Mitsubishi Chemical Industry Co., Ltd,.), 48 parts of a magnetic powder (Mabiroblack BL-500, a product of Titanium Industry Co., Ltd.), and 2 parts of MU-7 were mixed in a ball mill for 24 hours, and kneaded by a hot roller for 1 hour. The kneaded mixture was finely pulverized by a jet mill, heat-treated by a spray dryer, and classified by a zigzag classifier to form a magnetic toner having an average particle diameter of 15 micrometers.

By a conventional electrophotographic process, a latent electrostatic image was formed on a selenium photosensitive drum and developed with the magnetic toner. The toner image was transferred to a receptor sheet, and fixed by hot rollers kept at 200° C. Under these conditions, the copying process was continuously carried out through 5000 cycles. Copied images of good quality were obtained without the soiling of the hot rollers.

EXAMPLES 37

A maleic anhydride-grafted 4-methyl-1-pentene/1-hexene copolymer wax (MU-8) containing 3.1% by weight of maleic anhydride grafted and having an acid number of 35.3 mg-KOH/g and an intrinsic viscosity of 0.23 dl/g was prepared by the same reaction as in Example 30 using 500 g of a 4-methyl-1-pentene/1-hexene copolymer wax having a 1-hexene content of 35 mole % and an intrinsic viscosity of 0.22 dl/g and obtained by polymerization with a Ziegler catalyst, 20.0 g of maleic anhydride and 2.0 g of DTBPO.

A toner was prepared, a copying test was conducted, in the same way as in Example 36 except that MU-8 was used instead of MU-7. Copied images of good quality were obtained as in Example 36 without the soiling of the hot rollers.

COMPARATIVE EXAMPLE 18

A maleic anhydride-grafted polypropylene wax (MU-9) containing 0.35% by weght of maleic anhydride grafted and an acid value of 4.1 mg-KOH/g and an intrinsic viscosity of 0.38 dl/g was prepared in the same way as in Example 33 by adding 1.6 g of maleic anhydride and 6 g of DTBPO.

A toner was prepared, and a copying test was conducted, in the same way as in Example 30 except that MU-9 was used instead of MU-1.

The clearness of the image began to decrease approximately in the 4000th cycle of the copying process. At the same time, a film of the polypropylene wax was seen to form partly on the photosensitive drum and the surfaces of the iron carrier particles (filming phenomonon).

COMPARATIVE EXAMPLE 19

A maleic anhydride-grafted polypropylene wax (MU-10) containing 18.2% by weight of maleic anhydride and having an acid number of 207 mg-KOH/g and an intrinsic viscosity of 0.26 was prepared by the same method as in Example 30 by adding 150 g of maleic anhydride and 31 g of DTBPO.

A toner was prepared, and copying test was conducted through 1000 cycles, in the same way as in Example 31 except that MU-10 was used instead of MU-2.

The releasability of the toner from the hot rollers was inferior, and the offset phenomenon and the soiling of the receptor sheets were observed.

COMPARATIVE EXAMPLE 20

An oxidized polypropylene wax (MU-11) having an acid number of 22.5 mg-KOH/g and an intrinsic viscosity of 0.05 dl/g was prepared in the same way as in Example 35 by performing the oxidation reaction for 22 hours.

A toner was prepared, and a copying test was conducted, in the same way as in Example 30 except that MU-11 was used instead of MU-1.

The releasability of the toner image from the hot rollers was very inferior, and a marked filming phenomenon was observed on the photosensitive drum and the iron carrier particles.

COMPARATIVE EXAMPLE 21

A maleic anhydride-grafted polypropylene wax (MW-12) containing 1.0% by weight of maleic anhydride grafted and having an acid number of 11.2 mg-KOH/g and an intrinsic viscosity of 0.66 dl/g was preapred in the same way as in Example 33 by mixing 5.6 g of maleic anhydride and 5 g of DTBPO to the polypropylene wax and reacting the mixture at 220° C.

A toner was prepared, and a copying test was conducted through 1000 cycles, in the same way as in Example 30 except that MU-12 was used instead of MU-1.

The releasability of the toner image from the hot rollers was inferior and the offset phenomenon and the contamination of the receptor sheets were observed.

COMPARATIVE EXAMPLE 22

A toner was prepared, and a copying test was conducted, in the same way as in Example 31 except that the starting polypropylene wax having an intrinsic viscosity of 0.27 dl/g used to prepare MU-2 was used instead of MU-2.

The clearness of the image begin to decrease approximately in the 3500th cycle of the copying process. At the same time, a film of the polypropylene wax was seen to form partly on the surface of the photosensitive drum and the surfaces of the iron carrier particles (filming phenomenon).

The same bending test as in Example 31 was carried out. The toner peeled along the bent line, and the results were inferior to those obtained in Example 31.

COMPARATIVE EXAMPLE 23

The polypropylene (300 g) used to prepare MU-4 in Example 33 was charged into a 1-liter autoclave, and thermally decomposed at 340° C. for 2.2 hours while passing a minute amount of nitrogen through it. The resulting polypropylene wax had an intrinsic viscosity of 0.10 dl/g.

A toner was prepared, and a copying test was conducted, in the same way as in Example 31 except that the resulting polypropylene was used instead of MU-2.

The clearness of the image begin to decrease approximately in the 3500th cycle of the copying process. At the same time, a film of the polypropylene wax was seen to form partly on the surface of the photosensitive drum and the surfaces of the iron carrier particles (filming phenomenon).

The flowability of the toner was examined in the same way as in Example 30. A sample of the toner kept at 50° C. developed agglomerated masses having a size of about 5 mm at one side, and the toner had very poor flowability and was unsuitable for practical toner application.

COMPARATIVE EXAMPLE 24

A maleic anhydride-grafted polyethylene wax (MU-13) containing 4.0% by weight of maleic anhydride grafted and having an acid number of 45.6 mg-KOH/g and an intrinsic viscosity of 0.11 dl/g was prepared by the same method as in Example 30 by using 600 g of a polyethylene wax (homopolymer) having an intrinsic viscosity of 0.10 dl/g, 28.0 g of maleic anhydride and 3.0 g of DTBPO.

A toner was prepared, and a copying test was conducted, in the same way as in Example 30 except that MU-13 was used instead of MU-1.

Many brush marks were seen to occur in the solid portion of the image. Hence, the toner obtained in this example was unsuitable for practical toner application.

REFERENTIAL EXAMPLE 1

Low-molecular-weight high-density polyethylene having an intrinsic viscosity of 0.32 dl/g (540 g) was charged into a 1.5-liter glass reactor, and melted at 160° C. Then, 160 g of vinyl benzoate and 13.0 g of DTBPO were added, and the mixture was heated for 5 hours. While the reaction mixture was in the molten state, it was subjected to a deaerating treatment in vacuum at 5 mmHg for 1 hour to remove the volatile components. The residue was then cooled to give vinyl benzoate-modified low-molecularweight polyethylene (W-1) having an intrinsic viscosity of 0.33 dl/g. Thirty grams of the modified low-molecularweight polyethylene was dissolved in 300 ml of p-xylene. The solution was added to 1 liter of acetone at room temperature with stirring, and cooled to room temperature. The porecipitated solid portion was washed twice with 500 ml of acetone, and dried. The resulting solid portion was examined for the content of vinyl acetate by $^1$H-NMR. The amount of vinyl benzoate grafted, as determined in this way, was 21 parts per 100 parts of the vinyl benzoate-grafted low-molecular-weight polyethylene (27 parts per 100 parts of the starting unmodified polyethylene).

REFERENTIAL EXAMPLES 2–18

Modified W-2 to W-18 were prepared in the same way as in Example 1 except that the type and amount of the starting low-molecular-weight polyolefin, the type and amount of the aromatic vinyl carboxylate, the amount of DTBPO and the reaction time were changed as indicated in Table 2. The intrinsic viscosities of the modified low-molecular-weight polyolefins and the proportions of the vinyl carboxylates grafted are also shown in Table 2.

TABLE 2

| Referential Example | Starting low-molecular weight polyolefin | | | Aromatic carboxylic acid vinyl ester | |
|---|---|---|---|---|---|
| | Type | Intrinsic viscosity (dl/g) | Amount charged (g) | Type | Amount charged (g) |
| 1 | Low-molecular weight high-density polyethylene | 0.32 | 540 | Vinyl benzoate | 160 |
| 2 | Low-molecular weight high-density polyethylene | " | 350 | Vinyl benzoate | 350 |
| 3 | Low-molecular weight high-density polyethylene | " | 130 | Vinyl benzoate | 570 |
| 4 | Oxidized low-molecular-weight polyethylene (0.5 wt. % oxygen) | 0.28 | 270 | Vinyl benzoate | 430 |
| 5 | Oxidized low-molecular-weight polyethylene (0.5 wt. % oxygen) | " | 500 | Vinyl benzoate | 200 |
| 6 | Oxidized low-molecular-weight polyethylene (0.5 wt. % oxygen) | " | 130 | Vinyl benzoate | 570 |
| 7 | Low-molecular-weight polypropylene (4 mole % ethylene) | 0.12 | 470 | Vinyl cinnamate | 230 |
| 8 | Low-molecular-weight polypropylene (4 mole % ethylene) | " | 350 | Vinyl cinnamate | 350 |
| 9 | Low-molecular-weight polypropylene (4 mole % ethylene) | 0.04 | 520 | Vinyl cinnamate | 180 |
| 10 | Low-molecular-weight ethylene/propylene copolymer (52 mole % | 0.08 | 350 | Vinyl cinnamate | 350 |

TABLE 2-continued

| | | Amount | Reaction time (hours) | | Vinyl ... | |
|---|---|---|---|---|---|---|
| 11 | Low-molecular weight ethylene/propylene copolymer (52 mole % ethylene) | 0.08 | 500 | | Vinyl cinnamate | 200 |
| 12 | Low-molecular-weight low-density polyethylene (3 mole % propylene) | 0.32 | 390 | | Vinyl benzoate | 310 |
| 13 | Low-molecular-weight low-density polyethylene (3 mole % propylene) | " | 690 | | Vinyl benzoate | 10 |
| 14 | Low-molecular-weight low-density polyethylene (3 mole % propylene) | " | 150 | | Vinyl benzoate | 550 |
| 15 | Low-molecular-weight polybutene-1 | 0.21 | 530 | | Vinyl benzoate | 170 |
| 16 | Low-molecular-weight polybutene-1 | " | 625 | | Vinyl benzoate | 75 |
| 17 | Low-molecular-weight low-density polyethylene (6 mole % 4-methyl-1-pentene) | 0.51 | 550 | | Vinyl benzoate | 150 |
| 18 | Low-molecular-weight low-density polyethylene (6 mole % 4-methyl-1-pentene) | 0.76 | 570 | | Vinyl benzoate | 130 |

| Referential Example | Amount of DTBPO charged (g) | Reaction time (hours) | Modified low-molecular weight polyolefin Designation | Intrinsic viscosity (dl/g) | Amount of the aromatic carboxylic acid vinyl ester grafted (parts) |
|---|---|---|---|---|---|
| 1 | 15.0 | 5 | W-1 | 0.33 | 27 |
| 2 | 29.0 | 7 | W-2 | 0.34 | 82 |
| 3 | 40.0 | 9 | W-3 | 0.36 | 247 |
| 4 | 30.0 | 8 | W-4 | 0.30 | 122 |
| 5 | 17.0 | 5 | W-5 | 0.29 | 32 |
| 6 | 40.0 | 9 | W-6 | 0.32 | 231 |
| 7 | 19.0 | 5 | W-7 | 0.13 | 42 |
| 8 | 29.0 | 7 | W-8 | 0.14 | 85 |
| 9 | 15.0 | 5 | W-9 | 0.04 | 29 |
| 10 | 29.0 | 7 | W-10 | 0.10 | 94 |
| 11 | 17.0 | 5 | W-11 | 0.09 | 33 |
| 12 | 22.0 | 5 | W-12 | 0.33 | 66 |
| 13 | 1.0 | 1 | W-13 | 0.32 | 1.5 |
| 14 | 40.0 | 9 | W-14 | 0.35 | 228 |
| 15 | 14.0 | 5 | W-15 | 0.22 | 30 |
| 16 | 6.5 | 3 | W-16 | 0.21 | 11 |
| 17 | 12.5 | 5 | W-17 | 0.53 | 24 |
| 18 | 12.0 | 5 | W-18 | 0.78 | 21 |

EXAMPLE 38

Eighty-five parts of a styrene/n-butyl methacrylate copolymer (Himer SBM-600), 4 parts by weight of W-1 synthesized in Referential Example 1, 9 parts of carbon black (Diablack SH) and 9 parts of Zapon Fast Black (BASF) were mixed in a ball mill for 24 hours, and the mixture was kneaded by hot rolls. The mixture was cooled, pulverized and classified to prepare an electrostatic toner having a particle diameter of 13 to 15 micrometers. Then, 120 parts of the electrostatic toner was mixed with 100 parts of an iron powder carrier having an average particle diameter of 50 to 80 micrometers to form a developer.

By a conventional electrophotographic process, a latent electrostatic image was formed on a selenium photosensitive drum and developed with the developer. The toner image was transferred to a receptor sheet, and heat-fixed by hot rollers at 180° C. Even after 5000 cycles of copying, clear soil-free copied images were obtained without the offset phenomenon. Hardly any soiling of the hot rollers and the photosensitive drum was observed.

EXAMPLE 39

A toner was prepared from 7 parts of W-8 synthesized in Referential Example 8, 82 parts of Himer SBM-600, 9 parts of Diablack SH9 and 2 parts of Zapon Fast Black, and a copying test was conducted, in the same way as in Example 38. Even after 5000 cycles of copying, clear soil-free copied images were obtained without the offset phenomenon. Hardly any soiling of the hot rollers and the photosensitive drum was observed.

The toner image was subjected to the same bending test as in Example 2. It was found that there was hardly any change in the degree of fixation after the bending test, and the image had excellent bending resistance.

EXAMPLE 40

A toner was prepared, and a copying test was conducted, in the same way as in Example 38 except that W-12 was used instead of W-1 prepared in Example 38.

Even after 5000 cycles of copying, clear soil-free copied images were obtained without the offset phenomenon. Hardly any soiling of the hot rollers and the photosensitive drum was observed.

EXAMPLE 41

A toner was prepared, and a copying test was conducted, in the same way as in Example 38 except that W-17 was used instead of W-1 prepared in Example 38.

Even after 5000 cycles of copying, clear soil-free copied images were obtained without the offset phenomenon. Hardly any soiling of the hot rollers and the photosensitive drum was observed.

EXAMPLE 42

A toner was prepared, and a copying test was conducted, in the same way as in Example 38 except that W-4 was used instead of W-1 prepared in Example 38.

Even after 3000 cycles of copying, clear soil-free copied images were obtained without the offset phenomenon. Hardly any soiling of the hot rollers and the photosensitive drum was observed.

The flowability of the toner was examined in the same way as in Example 3. A toner sample kept at 50° C. for 48 hours has slightly lower flowability than a toner sample kept at room temperature, but developed no agglomerates masses, and this poses no practical problem.

EXAMPLE 43

A toner was prepared, and a copying test was conducted, in the same way as in Example 39 except that W-16 was used instead of W-8 prepared in Example 39.

Even after 5000 cycles of copying, clear soil-free copied images were obtained without the offset phenomenon. Hardly any soiling of the hot rollers and the photosensitive drum was observed.

The same bending test as in Example 2 was conducted. It was found that the degree of fixation was maintained in a very high ratio after the bending test, and the developed image had excellent bending resistance.

EXAMPLE 44

Forty-eight parts of polyester resin (Himer ES 508, a product of Sanyo Chemical Industry Co., Ltd.), 2 parts of carbon black (MA-100), 48 parts of a magnetic powder (Mabiroblack BL-500, a product of Titanium Industry Co., Ltd.) and 2 parts of W-2 were mixed in a ball mill for 24 hours, and kneaded by hot rolls for 1 hour. The kneaded mixture was finely pulverized by a jet mill, heat-treated by a spray dryer, and classified by a zigzag classifier to give a magnetic toner having an average particle diameter of 15 micrometers.

By a conventional electrophotographic process, a latent electrostatic image was formed on a selenium photosensitive drum and developed with the magnetic toner. The toner image was transferred to a receptor sheet, and fixed by hot rollers kept at 200° C. The copying test was conducted through 5000 cycles. Copied images of good quality were obtained without the soiling of the hot rollers.

EXAMPLE 45

An electrostatic toner was prepared in the same way as in Example 38 from 100 parts of W-15 prepared in Referential Example 15, 5 parts of carbon black (Diablack SH), and 2 parts of Zapon Fast Black B (BASF). Then, 120 parts of the electrostatic toner was mixed with 100 parts of an iron powder carrier having an average particle diameter of 50 to 80 micrometers to form a developer.

By a conventional electrophotographic process, a latent electrostatic image was formed on a selenium photosensitive drum and developed with the developer. The toner image was transferred to a receptor sheet and fixed by hot rollers. Even after 2000 cycles of copying, clear soil-free copied images were obtained without the offset phenomenon as in the early stage of the copying process. No soiling of the hot rollers and the drum was observed.

EXAMPLE 46

An electrostatic toner (containing a carrier) was prepared by the same method as in Example 45 from 50 parts of W-1 obtained in Referential Example 1, 50 parts of low-molecular-weight polystyrene (Himer ST-95), 2 parts of the same carbon black as used in Example 38 and 2 parts of Zapon Fast Black B (BASF). Using the resulting toner, a copying process was carried out through 10000 cycles in the same way as in Example 57. Clear soil-free copied images were obtained without the offset phenomenon as in the early stage of the copying process. No soiling of the hot rolls and the drum was observed.

COMPARATIVE EXAMPLE 25

A toner was prepared, and a copying test was conducted, in the same way as in Example 39 except that W-13 was used instead of W-8.

In the 4000th cycle, the clearness of the image began to decrease. At the same time, a film of the polyethylene wax was seen to form partly on the surface of the photosensitive drum or the surfaces of the iron carrier (filming phenomenon).

When the toner image was subjected to the same bending test as in Example 2, the toner was seen to peel considerably along the bent line, and the results were inferior to those obtained in Example 39.

COMPARATIVE EXAMPLE 26

A toner was prepared, and a copying test was conducted, in the same way as in Example 38 except that W-3 was used instead of W-1. It was found that the releasability of the toner image from the hot rollers was inferior, and the offset phenomenon and soiling of the receptor sheets were observed.

In the same way as in Example 3, the flowability of the toner with temperature changes was examined. It was found that a toner sample kept at 50° C. developed agglomerated masses having a size of more than 5 mm in one side and had poor flowability unsuitable for practical toner application.

COMPARATIVE EXAMPLE 27

A toner was prepared, and a copying test was conducted, in the same way as in Example 38 except that W-9 was used instead of W-1. It was found that the releasability of the toner image from the hot roll was very inferior, and a considerable filming phenomenon was observed in the photosensitive drum and the iron powder carrier.

COMPARATIVE EXAMPLE 28

Three hundred grams of the starting polypropylene used to prepare W-7 in Referential Example 7 was charged into a 1-liter autoclave and, thermally decomposed at 340° C. for 2.2 hours while passing a minute amount of nitrogen. The resulting polypropylene wax had an intrinsic viscosity of 0.06 dl/g.

A toner was prepared, and a copying test was conducted, in the same way as in Example 39 except that the resulting polypropylene wax was used instead of W-8.

Approximately in the 3500th cycle, the clearness of the image began to decrease. At the same time, a film of the polypropylene wax was seen to form partly on the surface of the photosensitive drum and the surfaces of the iron carrier particles (filming phenomenon).

The flowability of the toner was examined in the same way as in Example 3. It was found that a toner sample kept at 50° C. developed agglomerated masses having a size of more than 5 mm in one side and had poor flowability unsuitable for practical application.

COMPARATIVE EXAMPLE 29

An electrostatic toner was prepared in the same way as in Example 45 except that low-molecular-weight polystyrene (Himer ST-95) was used instead of W-15. A copying process was performed through 1000 cycles in the same way as in Example 45. It was found that the releasability of the toner image from the hot rollers was poor, and the offset phenomenon and the soiling of the receptor sheets were observed.

EXAMPLE 47

Forty parts of W-1 obtained in Referential Example 1, 50 parts of a magnetic powder (Mabiroblack BL-500), 10 parts of an ethylene/vinyl acetate copolymer (Evaflex 460) and 2 parts of carbon black (MA-100) were mixed in a ball mill for 24 hours, and kneaded by hot rolls for 1 hour. The kneaded mixture was finely pulverized by a jet mil, heat-treated by a spray dryer, and classified by a zigzag classifier to form a magnetic toner having an average particle diameter of 15 micrometers.

By a conventional electrophotographic process, a latent electrostatic image was formed on a selenium photosensitive drum and developed with the magnetic toner. The toner image was transferred to a receptor sheet and fixed by hot rolls kept at 200° C. The copying process was carried out through 5000 cycles. Copied images having good quality were obtained without the soiling of the hot rollers and the drum.

EXAMPLE 48

A magnetic toner was prepared in the same way as in Example 47 except that a mixture of 25 parts of W-1 and 25 parts of low-molecular-weight polystyrene used in Example 47 was used as a resin component instead of 40 parts of W-1. A copying test was carried out through 2000 cycles using the resulting magnetic toner. Copied images of good quality were obtained without the soiling of the hot rolls and the drum.

COMPARATIVE EXAMPLE 30

A magnetic toner was prepared in the same way as in Example 47 except that the low-molecular-weight polystyrene used in Comparative Example 29 was used instead of W-1. A copying test was performed using the resulting magnetic toner. After 1000 cycles of copying, the hot rollers were soiled and the copied image became obscure.

EXAMPLE 49

A toner was prepared by the same method as in Example 47 except that W-4 was used instead of W-1. A copying process was performed through 5000 cycles using the resulting toner. Copied images of good quality were obtained without the soiling of the hot rollers and the drum.

What is claimed is:

1. A heat-fixable electrophotographic toner composition comprising
   (A) a graft modified polyolefin composed of 100 parts by weight of a polyolefin having an intrinsic viscosity, measured in decalin at 135° C., of from 0.04 to 1.2 dl/g, and grafted thereto, per 100 parts by weight of the polyolefin, a first monomer selected from the group consisting of (a) 10 to 100 parts by weight of acrylonitrile or methacrylonitrile, (b) 3 to 200 parts by weight of an aromatic carboxylic acid vinyl ester and (c) 2 to 43 parts by weight of an ester of unsaturated dicarboxylic acid, and (d) 0 to 70 mole %, based on said monomer, of another monomer other than said first monomer, and
   (B) a coloring agent.

2. The toner composition of claim 1 wherein the graft modified polyolefin is composed of 100 parts by weight of a polyolefin having an intrinsic viscosity of 0.05 to 0.8 dl/g and grafted thereto 1.0 to 100 parts by weight of acrylonitrile or methacrylonitrile.

3. The toner composition of claim 2 wherein the graft modified polyolefin is composed of 100 parts by weight of a polyolefin having an intrinsic viscosity of 0.05 to 0.8 dl/g and grafted thereto, 2.0 to 80 parts by weight of acrylonitrile or methacrylonitrile.

4. The toner composition of claim 2 wherein the polyolefin has an intrinsic viscosity of 0.07 to 0.7 dl/g.

5. The toner composition of claim 1 wherein the graft modified polyolefin is composed of 100 parts by weight of a polyolefin having an intrinsic viscosity of 0.04 to 1.2 dl/g and grafted thereto 3 to 200 parts by weight of the aromatic carboxylic acid vinyl ester.

6. The toner composition of claim 5 wherein the graft modified polyolefin is composed of 100 parts by weight of a polyolefin having an intrinsic viscosity of 0.04 to 1.2 dl/g and grafted thereto 5 to 200 parts by weight of the aromatic carboxylic acid vinyl ester.

7. The toner composition of claim 5 wherein the polyolefin has an intrinsic visocisty of 0.05 to 1.1 dl/g.

8. The toner composition of claim 1 wherein the graft modified polyolefin is composed of 100 parts by weight of a polyolefin having an intrinsic viscosity of 0.07 to 0.6 dl/g and grafted thereto, 2 to 43 parts by weight of the ester of unsaturated dicarboxylic acid.

9. The toner compositioin of claim 8 wherein the graft modified polyolefin is composed of 100 parts by weight of a polyolefin having an intrinsic viscosity of 0.07 to 0.6 dl/g and grafted thereto, 3 to 33 parts by weight of the ester of unsaturated dicarboxylic acid.

10. The toner composition of claim 8 wherein the polyolefin has an intrinsic viscosity of 0.08 to 0.5 dl/g.

11. A heat-fixable electrophotographic developer composition comprising
    (A) a mixture of (a) 20 to 1% by weight of a graft modified polyolefin composed of 100 parts by weight of a polyolefin having an intrinsic viscosity, measured in decalin at 135° C., of from 0.04 to 1.2 dl/g, and grafted thereto, per 100 parts by weight of the polyolefin, a first monomer selected from the group consisting of (a) 1.0 to 100 parts by weight of acrylonitrile or methacrylonitrile, (b) 3 to 200 parts by weight of an aromatic carobxyllic acid vinyl ester and (c) 2 to 43 parts by weight of an ester of unsaturated dicarboxylic acid, and (d) 0 to 70 mole %, based on said first monomer, of another monomer other than said first monomer, as a releasing agent, and (2) 40 to 99% by weight of a thermoplastic binder resin other than said graft-modified polyolefin; and (B) a coloring agent.

12. A heat-fixable electrophotographic toner composition comprising (A) a mixture of (1) more than 25% by weight of a graft modified polyolefin composed of 100 parts by weight of a polyolefin having an intrinsic viscosity, measured in decalin at 135° C., of from 0.04 to 1.2 dl/g, and grafted thereto, per 100 parts by weight of the polyolefin, a monomer selected from the group consisting of (a) 1.0 to 100 parts by weight of acrylonitrile or methacrylonitrile, (b) 3 to 200 parts by weight of an aromatic carboxylic acid vinyl ester and (c) 2 to 43 parts by weight of an ester of unsaturated dicarboxylic acid, and (d) 0 to 70 mole %, based on said first monomer, of another monomer other than said first monomer as a binder; and (2) less than 75% by weight of a thermoplastic resin other than the graft modified polyolefin and (B) a coloring agent.

13. A heat-fixable electrophotographic toner composition comprising (A) a mixture of (1) 20 to 1% by weight of a polyolefin comprising polymer units of an alpha-olefin having 3 to 10 carbon atoms as main structural units of its skeleton, containing carboxyl groups, and having an intrinsic viscosity of 0.06 to 0.6 dl/g and an acid number of 6 to 200 mg-KOH/g as a releasing agent and (2) 80 to 99% by weight of a thermoplastic binder resin other than said polyolefin; and (B) a coloring agent.

14. The toner composition of claim 1 wherein the polyolefin is a homopolymer or copolymer of a linear or branched alpha-olefin having from 2 to 10 carbon atoms.

15. The toner composition of claim 14 wherein the polyoolefin is a waxy polyolefin.

16. The toner composition of claim 5 wherein the aromatic carboxylic acid vinyl ester comprises vinyl benzoate or vinyl cinnamate.

17. The toner composition of claim 8 wherein the ester of unsaturated dicarboxylic acid is selected from the group consisting of monoethyl maleate, diethyl maleate, monopropyl maleate, dipropyl maleate, monobutyl maleate, dibutyl maleate, di(2-ethylhexyl)maleate, monoethyl fumarate, diethyl fumarate, dibutyl fumarate, di(2-ethylhexyl) fumarate, monoethyl itaconate, diethyl itaconate, monobutyl itaconate, di(2-ethylhexyl) itaconate, monoethyl citraconate, diethyl citraconate, dibutyl citraconate and di(2-ethylhexyl) citraconate.

18. The developer composition of claim 11 wherein the thermoplastic binder resin other than the graft modified polyolefin is a homopolymer of a styrene monomer or a copolymer of a styrene monomer with a copolymerizable vinyl monomer, said styrene homopolymer or copolymer having a number average molecular weight of from 3000 to 30,000.

19. The developer composition of claim 12 wherein the thermoplastic binder resin other than the graft modified polyolefin is a homopolymer of a styrene monomer or a copolymer of a styrene monomer with a copolymerizable vinyl monomer, said styrene homopolymer or copolymer having a number average molecular weight of from 3000 to 30,000.

20. The developer composition of claim 13 wherein the thermoplastic binder resin other than the graft modified polyolefin is a homopolymer of a styrene monomer or a copolymer of a styrene monomer with a copolymerizable vinyl monomer, said styrene homopolymer or copolymer having a number average molecular weight of from 3000 to 30,000.

21. The toner composition of claim 13 wherein the carboxyl groups are derived from maleic acid, maleic anhydride, crotonic acid, endocis-bicyclo-[2,2,1]hept-2-ene-5,6-dicarboxylic acid and endocis-bicyclo-[2,2,1]hept-2-ene-5,6,dicarboxylic acid anhydride.

* * * * *

UNITED STATES PATENT AND TRADEMARK OFFICE
CERTIFICATE OF CORRECTION

PATENT NO. : 4,810,612
DATED      : March 7, 1989
INVENTOR(S) : TAKASHI UEDA ET AL.

It is certified that error appears in the above-identified patent and that said Letters Patent is hereby corrected as shown below:

On the Cover Page, under Related U.S. Application Data,

"Aug. 4, 1987" should read --Aug. 5, 1987--.

Claim 1, line 8 of the claim, "10" should read --1.0--.

Claim 11, line 11 of the claim, "carobxyllic" should read --carboxylic--.

Claim 15, line 2 of the claim, "polyoolefin" should read --polyolefin--.

Claim 21, line 5 of the claim, "-5,6,dicarboxylic" should read -- -5,6-dicarboxylic--.

Signed and Sealed this

Fifteenth Day of August, 1989

Attest:

DONALD J. QUIGG

Attesting Officer

Commissioner of Patents and Trademarks